United States Patent
Matsuoka et al.

Patent Number: 5,664,540
Date of Patent: Sep. 9, 1997

[54] PRE-COMBUSTION CHAMBER-TYPE ENGINE

[75] Inventors: Hiroshi Matsuoka, Yamato; Keiji Kishishita; Takahiro Tsubonuma, both of Yokohama; Takatoshi Sugano, Sagamihara, all of Japan

[73] Assignee: Isuzu Motors Limited, Tokyo, Japan

[21] Appl. No.: 597,202

[22] Filed: Feb. 6, 1996

[51] Int. Cl.$^6$ ........................ F02B 19/16
[52] U.S. Cl. ........................ 123/254
[58] Field of Search ........................ 123/254

[56] References Cited

U.S. PATENT DOCUMENTS

| | | | |
|---|---|---|---|
| 4,738,227 | 4/1988 | Kamo et al. | 123/254 |
| 5,520,148 | 5/1996 | Kawamura et al. | 123/254 |

FOREIGN PATENT DOCUMENTS

| | | |
|---|---|---|
| 58-79019 | 5/1983 | Japan . |
| 4-117149 | 10/1992 | Japan . |

*Primary Examiner*—Andrew M. Dolinar
*Attorney, Agent, or Firm*—Browdy and Neimark

[57] ABSTRACT

The present invention provides a pre-combustion chamber-type engine, which optimizes the relation between the heat capacity of the pre-combustion chamber structure that forms the pre-combustion chamber and the displacement per cylinder and thereby improves the net average effective pressure and fuel efficiency. In this pre-combustion chamber-type engine, which has the pre-combustion chamber structure 15 installed in the cylinder head 3 so that it is surrounded by a heat insulating layer, the ratio of the heat capacity of the pre-combustion chamber structure to the displacement per cylinder is set to 0.35 cal/°C.·cm$^3$ or less. Alternatively, the ratio of the heat capacity of the pre-combustion chamber structure to the inner surface area of the pre-combustion chamber is set to 0.55 cal/°C.·cm$^2$ or lower.

24 Claims, 13 Drawing Sheets

[ Relation between the pre-combustion chamber inner wall temperature and the heat capacity during cold start ]

[ Effect of the pre-combustion chamber inner wall temperature on the compression end temperature ]

PRE-COMBUSTION CHAMBER-TYPE ENGINE

BACKGROUND OF THE INVENTION

1. Field of the Invention

The present invention relates to a pre-combustion chamber-type engine with a pre-combustion chamber structure installed in a cavity formed in a cylinder head or piston.

2. Background of the Invention

A conventional pre-combustion chamber-type engine has a construction, in which a cylinder head provided with intake and exhaust ports is formed with a cavity; in which a hot plug having a communication hole to communicate the pre-combustion chamber and the main combustion chamber is fitted in the lower part of the cavity; and in which fuel is injected into the pre-combustion chamber from a fuel injection nozzle. In another pre-combustion chamber-type engine, a pre-combustion chamber structure, which forms a pre-combustion chamber and has a communication hole communicating the pre-combustion chamber and the main combustion chamber, is installed in a cavity formed in the cylinder head, with fuel injected into the pre-combustion chamber from the fuel injection nozzle. Such pre-combustion chamber-type engines are disclosed in, for example, Japan Utility Model Laid-Open Nos. 117149/1992 and 79019/1983.

The pre-combustion chamber type-engine disclosed in Japan Utility Model Laid-Open No. 117149/1992 has formed thin the fuel impinging portion of the pre-combustion chamber wall body in the cylinder head to reduce the heat capacity of the fuel impinging portion to enable rapid temperature increase. In this pre-combustion chamber type-engine, the portion of the pre-combustion chamber wall body that the fuel jet from the fuel injection nozzle strikes is formed thinner than other portions, the outer side of the pre-combustion chamber wall body is recessed to reduce the heat capacity, and a heat insulating layer is formed between the recessed portion and the wall surface of the hole portion of the cylinder head.

In the pre-combustion chamber type engine disclosed in Japan Utility Model Laid-Open No. 79019/1983, the pre-combustion chamber member, fitted in a cavity or receiving hole formed in the cylinder head, is divided into an upper pre-combustion chamber member made of a ceramics material and forming the upper part of the pre-combustion chamber and a lower pre-combustion chamber member made of a ceramics material and forming the lower part of the pre-combustion chamber. A gasket, which has an elasticity in the direction of insertion to the receiving hole, is installed in a joint portion between the upper and lower pre-combustion chamber members.

In recent years, a pre-combustion chamber type engine has become available, in which a cavity is formed in the piston installed slidably movable in the cylinder, and in which a pre-combustion chamber structure, that forms the pre-combustion chamber and has a communication hole to communicate the pre-combustion chamber and the main combustion chamber and a hole into which a fuel injection nozzle is inserted, is arranged in the cavity, with fuel injected into the pre-combustion chamber.

In diesel engines, it is known that the engines' theoretical heat efficiency, i.e., the designated average effective pressure $P_{mi}$, changes greatly according to the compression ratio as shown in FIG. 11. The higher the compression ratio, the better the designated average effective pressure. As the compression ratio is increased, however, the pressure in the cylinder increases, causing the mechanical loss, i.e., the friction average effective pressure $P_{mf}$, to rise. The net average effective pressure $P_{me}$ which represents the fuel efficiency of the engine (virtual heat efficiency) does not increase proportionately with the compression ratio, but levels off at a certain point. Hence, in the diesel engine, the best thermal efficiency is obtained when the compression ratio is in the shaded range of 18.5 to 20.5 in FIG. 11.

In the conventional 1600-cc 4-cylinder pre-combustion chamber type diesel engines, the compression ratio is normally around 22 (see FIG. 12). In the 1600-cc-4-cylinder pre-combustion chamber type diesel engines, the highest thermal efficiency is theoretically obtained when the compression ratio is close to 19. The optimum compression ratio as related to the displacement per cylinder changes as indicated by the curve E. With the diesel engines, however, setting the compression ratio to 19 makes the cold start difficult and it is unavoidable to set the compression ratio high to secure good starting performance, which in turn lowers the thermal efficiency.

FIG. 12 shows the relation between the displacement per cylinder and the compression ratio in the pre-combustion chamber type engine. FIG. 12 plots such relations with circular, triangular and square marks, for a Case of the conventional pre-combustion chamber type engine that was started within a cranking time of 10 seconds. It is seen that the conventional pre-combustion chamber-type engine has a feature almost following the curve G. The curve G is the result of having to set the compression ratio unnecessarily high to secure the cold start. The conventional pre-combustion chamber type engine is therefore considered to have the necessary starting performance. The curve G, as described later, can be given by the following general expression.

$$y = 0.03579z - 2.2$$

where $Z = 1/(-0/01029x^{1/3} - 1)$.

The pre-combustion chamber type diesel engine (IDI) requires a high compression ratio compared with the direct injection type diesel engine (DI), as shown in FIG. 13. This is to secure the compression end temperature required for ignition during cold starting of the diesel engine. That is, the pre-combustion chamber type diesel engine has a large inner wall surface area of the combustion chamber and therefore a large heat dissipating area compared with the direct injection type diesel engine. Furthermore, because the air flow in the pre-combustion chamber, particularly in the swirl chamber, is very active, the heat conduction of the pre-combustion chamber inner wall portion is high and the flux of heat being dissipated is large. In the pre-combustion chamber type diesel engine, therefore, it is not possible to select the compression ratio that makes the net average effective pressure $P_{me}$ maximum (in FIG. 13, indicated by $MaxP_{me}$), and the use of high compression ratio lowers the fuel efficiency.

In general pre-combustion chamber-type engines, only the lower part of the pre-combustion chamber is formed of a heat insulating material and the upper part is provided by the body of the cylinder head. The upper part of the pre-combustion chamber, which receives heat from the hot compressed air during starting, is in direct contact with cooling water and thus its temperature hardly increases. The lower part of the pre-combustion chamber is in many cases fitted under pressure into the cylinder head, and heat flows from the pre-combustion chamber to the cylinder head body to the cooling water, with the result that the temperature rise is very slow. Further, in the pre-combustion chamber type engine whose entire pre-combustion chamber is formed of a heat insulating material, the pre-combustion chamber structure is generally fitted under pressure into the cylinder head body and heat flows from the pre-combustion chamber to the cylinder head to the cooling water, so that the temperature increase is slow. Because the member forming the entire pre-combustion chamber has a large heat capacity, the temperature rise of the pre-combustion chamber is slow even if the heat flow from the pre-combustion chamber to the cylinder head is cut off. And the bad starting performance makes it necessary to increase the compression ratio.

Generally, the diesel engine uses a glow plug as an assist to secure reliable starting. Because the cranking time is 10 seconds at most, when more than 10 seconds of cranking is required, it is decided that the engine has failed to start.

SUMMARY OF THE INVENTION

A primary object of this invention is to solve the above-mentioned technical problems and to improve the heat efficiency by forming the pre-combustion chamber in a heat insulation structure and by reducing the heat capacity of the pre-combustion chamber as much as possible to enable combustion at a low compression ratio without lowering the starting performance and without increasing the friction average effective pressure. It is another object of this invention to provide a pre-combustion chamber-type engine, in which, by considering the fact that after 10 seconds of cranking the temperature rise in the pre-combustion chamber becomes small producing little engine starting effect, as indicated by the analysis performed on the cranking time and the average pre-combustion chamber temperature with respect to the ratio of the heat capacity to the displacement or pre-combustion chamber inner surface area when the glow plug is turned on, the cranking time of 10 seconds is set as a limit criterion for determining whether the engine should be started or not; and in which the relation between the heat capacity of the pre-combustion chamber and the engine displacement or pre-combustion chamber inner surface area during the cold starting is tested and analyzed and the ratio of the heat capacity of the pre-combustion chamber to the engine displacement or pre-combustion chamber inner surface area is set equal to or lower than a predetermined value so that the compression end temperature reaches the ignition temperature of about 390° C. within 10 seconds of cranking, thereby ensuring good starting performance, allowing combustion at a reduced compression ratio and improving the net average effective pressure $P_{me}$, i.e., thermal efficiency.

The present invention relates to a pre-combustion chamber-type engine, which comprises: a cylinder block having cylinder bores; a cylinder head mounted to the cylinder block; main combustion chambers in the cylinder bores; pistons that reciprocate in the cylinder bores; cavities formed either in the cylinder head or in the pistons; pre-combustion chamber structures installed in the cavities with heat insulation air layers interposed therebetween; pre-combustion chambers formed in the pre-combustion chamber structures; communication holes formed in the pre-combustion chamber structures to communicate the pre-combustion chambers and the main combustion chambers; and fuel injection nozzles to inject fuel into the pre-combustion chambers; wherein the pre-combustion chamber structures are installed in the cavities in such a way as to be surrounded and heat-insulated by the heat insulation layers and the ratio of heat capacity of the pre-combustion chamber structures to the displacement of the cylinder bores is set 0.035 cal/°C.·cm³ or lower.

In this pre-combustion chamber type engine, when the ratio of the heat capacity of the pre-combustion chamber structures to the displacement per cylinder is set to 0.035 cal/°C.·cm³ or lower, the compression ratio β as related to the per-cylinder displacement is demarcated at the upper limit by an approximation equation:

$$y = 0.03579z - 2.2$$

where $Z = 1/(0.01029x^{1/3} - 1)$, y is the compression ratio and x is a non-dimensional number of displacement.

This pre-combustion chamber type engine of the above construction can secure good starting performance if the compression ratio is made smaller than that of the conventional pre-combustion chamber type engine. This in turn makes it possible to reduce mechanical loss, i.e., friction average effective pressure and thereby improve the net average effective pressure or heat efficiency and fuel efficiency.

Alternatively, this invention relates to a pre-combustion chamber type engine, which comprises: a cylinder block having cylinder bores; a cylinder head mounted to the cylinder block; main combustion chambers in the cylinder; pistons that reciprocate in the cylinder; cavities formed either in the cylinder head or in the pistons; pre-combustion chamber structures installed in the cavities with heat insulation air layers interposed therebetween; pre-combustion chambers formed in the pre-combustion chamber structures; communication holes formed in the pre-combustion chamber structures to communicate the pre-combustion chambers and the main combustion chambers; and fuel injection nozzles to inject fuel into the pre-combustion chambers; wherein the pre-combustion chamber structures are installed in the cavities in such a way as to be surrounded and heat-insulated by the heat insulation layers and the ratio of heat capacity of the pre-combustion chamber structures to the inner surface area of the pre-combustion chambers is set to 0.55 cal/°C.·cm² or lower.

In this pre-combustion chamber type engine, when the ratio α of the heat capacity of the pre-combustion chamber structures to the inner surface area of the pre-combustion chambers is set to 0.55 cal/°C.·cm² or lower, the compression ratio as related to the inner surface area of the pre-combustion chambers is demarcated at the upper limit by an approximation equation:

$$y = 0.03579z - 2.2$$

where $Z = 1/(-0.01029s^{1/3} - 1)$, y is the compression ratio and s is a non-dimensional number of the inner surface area.

In this pre-combustion chamber type engine, the pre-combustion chamber structures are each installed in the cavities formed in the cylinder head with a gap between the pre-combustion chamber structures and the cavities.

Further, the pre-combustion chamber structures each comprises an upper member and a lower member that are made of a heat resisting material and divided from each other in a direction crossing the cylinder axis, and a damping ring is installed between the upper member and the lower member.

Alternatively, the pre-combustion chamber structures each comprise an inner wall member made of a ceramics material and a reinforcement ring made of a metal material fitted over the outer circumference of the inner wall member. Further, the inner wall member made of the ceramics material comprises an upper member and a lower member that are divided from each other in a direction crossing the cylinder axis. The reinforcement ring is tightened around the outer circumference of the inner wall member made of a ceramics material by shrinkage fit. The reinforcement ring is tightened around the outer circumference of the inner wall member made of a ceramics material by casting. Alternatively, the pre-combustion chamber structures are formed of a heat resisting metal and a flange portion formed at the lower part of the pre-combustion chamber structures is fitted under pressure into the cavities of the cylinder head.

Alternatively, in this pre-combustion chamber type engine, the pre-combustion chamber structures are installed in the cavities formed in the pistons with a gap formed between the pre-combustion chamber structures and the cavities and extending in the circumferential direction, and the pre-combustion chamber structures are formed with an insertion hole through which the fuel injection nozzle protrudes into the pre-combustion chamber when the piston is near the top dead center.

Further, the pre-combustion chamber structures each comprise a circumferential wall portion made of a ceramics material, an upper wall portion that closes the top surface of the circumferential wall portion and has a communication hole to communicate the pre-combustion chamber and the main combustion chamber and an insertion hole through which a fuel injection nozzle is inserted, a lower wall portion that closes the bottom surface of the circumferential wall portion, and a mounting portion provided to the lower wall portion and having a grove formed in the outer circumference of the lower end thereof, the groove in the mounting portion being Joined to the piston by metal flow processing.

Alternatively, the pre-combustion chamber structures each comprise a circumferential wall portion made of a heat resisting metal, an upper wall portion that closes the top surface of the circumferential wall portion and has a communication hole to communicate the pre-combustion chamber and the main combustion chamber and an insertion hole through which a fuel injection nozzle protrudes into the pre-combustion chamber, a lower wall portion that closes the bottom surface of the circumferential wall portion, and a mounting portion provided to the lower wall portion and having the outer circumference thereof threaded, which is fastened with a nut to fix the pre-combustion chamber structure to the piston.

Alternatively, the pre-combustion chamber structures each comprise a circumferential wall portion made of a heat resisting metal, an upper wall portion that closes the top surface of the circumferential wall portion and has a communication hole to communicate the pre-combustion chamber and the main combustion chamber and an insertion hole through which a fuel injection nozzle protrudes into the pre-combustion chamber, a lower wall portion that closes the bottom surface of the circumferential wall portion, and a mounting portion provided to the lower wall portion, with only the upper wall portion joined to the top of the piston body.

As described above, because this pre-combustion chamber-type engine sets the ratio $\beta$ of the heat capacity of the pre-combustion chamber structure to the displacement per cylinder to 0.035 cal/°C·cm³ or lower, it is possible to reduce the compression ratio and raise the inner wall temperature of the pre-combustion chamber quickly by cranking.

That is, when the ratio $\beta$ of the heat capacity of the pre-combustion chamber structure to the displacement per cylinder is set to 0.035 cal/°C·cm³ or lower, the compression ratio as related to the per-cylinder displacement is demarcated at the upper limit by an approximation equation:

$$y=0.03579^z-2.2$$

where $Z=1/(-0.01029x^{1/3}-1)$, y is compression ratio and x is a non-dimensional number of displacement.

That is, the compression ratio is set so as to secure the compression end temperature required for starting. A predetermined value of compression end temperature Is secured by the engine. Let the compression end temperature be T, the compression starting temperature (open air temperature) be $T_0$, the compression ratio be $\epsilon$, and the polytropic number be m, then the following relation holds.

$$T=T_0 \cdot \epsilon^{m-1}$$

The polytropic number increases as the value of (combustion chamber surface area)/(volume) decreases.

Let a stand for a coefficient, x for displacement, $L^3$ for volume and $L^2$ for surface area, we get $$m=a \cdot L=a \cdot x^{1/3}$$

Substituting m into the above equation results in $$T/T_0=\epsilon^{aL-1}$$

where $L=x^{1/3}$.

If we substitute b for $T/T_0$ and y for $\epsilon$, then $$y^{aL-1}=b$$

$$y=b^{1/(aL-1)}$$

where $L=x^{1/3}$.

Here, determining the values of a and b by the method of least squares using the existing engine data, we obtain $a=-0.01029$ and $b=0.03579$. Substituting these values into the above equation, we get $$y=0.03579^z$$

where $Z=1/(-0.01029x^{1/3}-1)$.

In this pre-combustion chamber-type engine because the pre-combustion chamber is constructed in a heat insulating structure, it is possible, for the reasons mentioned above, to lower the compression ratio from the compression ratio set in the existing engines by about 2.2. That is, the compression ratio can be set to or below $y=0.03579^z-2.2$. Although the difference by which the compression ratio can be reduced is about 2.2, as shown in the diagram (FIG. 12) of the pre-combustion chamber type engine, the difference value of 2.2 can be varied to about 1.4.

Alternatively, because the ratio $\alpha$ of the heat capacity of the pre-combustion chamber structure to the pre-combustion chamber inner surface area is set to or below 0.55 cal/°C·cm², the compression ratio can be reduced and the thermal energy dissipated from the pre-combustion chamber through the cylinder head can be reduced and optimized, thereby raising the pre-combustion chamber inner wall temperature quickly by cranking.

To summarize, with this pre-combustion chamber type engine, the ratio $\beta$ of the heat capacity of the pre-combustion chamber structure to the per-cylinder displacement is set to 0.035 cal/°C·cm³ or lower, or the ratio $\alpha$ of the heat capacity of the pre-combustion chamber structure to the pre-combustion chamber inner surface area is set to 0.55 cal/°C·cm² or lower. This makes it possible to reduce the compression ratio blow that of the conventional pre-combustion chamber type engine and to secure good starting performance, reduce mechanical loss and improve the net average effective pressure, i.e., heat efficiency, and therefore fuel efficiency.

In this pre-combustion chamber type engine, the relation between the heat capacity and the inner surface area of the pre-combustion chamber structure suggests that the rate of rise of the pre-combustion chamber wall temperature is determined by the ratio of the heat inflow to the heat capacity of the pre-combustion chamber. The inflow of heat from the gas to the pre-combustion chamber wall is defined by the amount of heat transferred.

Let the amount of heat transferred be Q, the physical property value of the working gas or heat conductivity determined by flow speed be $\alpha$, the pre-combustion chamber inner surface area be F, the continuously changing gas temperature at a certain timing be $t_g$, and the pre-combustion chamber wall temperature be $t_w$. Then the following equation holds.

$$Q = \alpha \cdot F(t_g - t_w)$$

The amount of heat transferred for a certain duration is obtained by integrating the Q, or $\int Q$. If the outer circumference of the pre-combustion chamber is completely insulated from the engine body, the temperature rise of the pre-combustion chamber $\Delta T$ is given by $$\Delta T = HC / \int Q$$

where HC is the heat capacity of the pre-combustion chamber.

In this pre-combustion chamber type engine, it is apparent that the heat flowing into the combustion chamber is proportional to the pre-combustion chamber inner surface area F determined by the size of engine and the shape of the pre-combustion chamber. Hence, the pre-combustion chamber inner surface area F is considered as one parameter. In another embodiment, it is possible to take as one parameter the engine displacement which corresponds to the pre-combustion chamber inner surface area. This case considers the ratio between the heat capacity and the per-cylinder displacement.

The reason that the pre-combustion chamber-type engine uses the 10 seconds of cracking as a limit criterion for determining whether the engine should be started or not is that after 10 seconds of cranking, the characteristic curves become horizontal, as shown in FIG. 14, indicating that further cranking is not likely to increase the temperature high enough to cause ignition. The amount of heat produced by the glow plug is almost constant and used to ignite the fuel mixture. Although this glow plug heat is required for the ignition at the start, it is too small to raise the temperature of the whole air in the pre-combustion chamber. Whether the flame will propagate or not depends almost on the air temperature in the pre-combustion chamber.

As in this pre-combustion chamber type engine, the air temperature in the pre-combustion chamber can be raised to a region where the mixture can be ignited and burned, by setting the ratio $\beta$ of the heat capacity of the pre-combustion chamber structure to the displacement per cylinder to 0.035 cal/°C·cm³ or less (which corresponds to the shaded area in FIG. 12) or by setting the ratio a of the heat capacity of the pre-combustion chamber structure to the pre-combustion chamber inner surface area to 0.55 cal/°C·cm² or less (which corresponds to the shaded area in FIG. 12).

In this pre-combustion chamber-type engine, although the engine performance improves as the heat capacity of the pre-combustion chamber structure decreases, a practical design of the pre-combustion chamber structure does not permit the heat capacity to be reduced any further because of the stresses acting on the pre-combustion chamber structure. In other words, the pre-combustion chamber structure bent capacity involves a design-imposed lower limit of a structure thickness, which is determined as follows.

Assuming, for example, that the displacement m per cylinder in the engine is 500 cc, that the compression ratio $\epsilon$ that can be achieved with this invention is 20, and that the ratio of the volume of the pre-combustion chamber to the entire volume of the combustion chamber is 50%, the volume v of the pre-combustion chamber is as follows.

$$\epsilon = (V+m)/V$$

$$20 = (V+500)/V$$

$$V = 26.32 \text{ cc}$$

$$v = V/2 = 26.32/2 = 13.16 \text{ cc}$$

Because the shape of the pre-combustion chamber structure with the volume of 13.16 cc which offers the greatest strength is a sphere, when we consider the lower limit of the heat capacity of the pre-combustion chamber structure, let us assume that the pre-combustion chamber is shaped like a globe. If the radius of the sphere is denoted by r, the volume v of the sphere or pre-combustion chamber is given as follows.

$$v = 4\pi r^3/3 \text{ and } v = 13.16 \text{ cc}$$

Therefore r is 14.65.

Next, the strength of the material is examined. The wall surface temperature of the pre-combustion chamber is 700°–800° C. and the allowable stress $\sigma$ of the heat resisting alloy is assumed to be $\sigma = 1.0$ kgf/mm².

Similarly, in the case of ceramics, such as $Si_3N_4$, its high temperature strength does not decrease as much as metallic materials. If we assume that the best of the currently mass-produced materials has a strength of 120 kgf/mm², the design strength that can endure practical use is $\sigma = 1.0$ kgf/mm² considering the fatigue life, effective volume and variations of quality.

In the spherical pre-combustion chamber structure, assuming the outer diameter of the sphere is b, that the inner diameter is a, and that the maximum pressure P in the cylinder is 150 kgf/cm², the thickness of the sphere (b-a) that results in the maximum stress $\sigma\theta = 1.0$ kgf/mm² is calculated. The maximum stress, i.e., the stress in the circumferential direction $\sigma\theta$ when the inner pressure of the sphere is applied to the pre-combustion chamber structure is as follows.

$$\sigma\theta = [Pa^3/(b^3-a^3)] \cdot [b^3/2R^3 + 1]$$

where $R = (a+b)/2$.

Here, because $P = 150$ kgf/cm² $= 150 \times 10^{-2}$ kgf/mm², a=r= 14.65 mm and $\sigma\theta = 1.0$ kgf/mm², the outer diameter b of the sphere is b=15.65 mm.

At this time, the volume X of the wall body of the sphere is given by $$\begin{aligned} X &= [4\pi b^3/3] - [4\pi a^3/3] \\ &= (16.6 - 13.16) \times 10^3 \\ &= 2.9 \text{ times } 10^3 \text{ mm}^3 = 2.9 \times 10^{-6} \text{ cm}^3 \end{aligned}$$

If the specific heat c of the heat resisting alloy is $1.1 \times 10^{-1}$ kcal/kg°C. and the density $\gamma$ of the heat resisting alloy is 8500 kg/cm³, the heat capacity of the sphere CM is as follows.

$$CM = X \cdot c \cdot \gamma$$
$$= 2.9 \times 10^{-6} \times 8500 \times 1.1 \times 10^{-1} \times 10^3 \text{ kcal/}°C.$$
$$= 2.71 \text{ cal/}°C.$$

If the specific heat c of $Si_3N_4$ is $1.69 \times 10^{-1}$ kcal/kg°C. and the density y of $Si_3N_4$ is 3200 kg/m³, the heat capacity CS of the sphere is given by $$CS = X \cdot c \cdot \gamma$$
$$= 2.9 \times 10^{-6} \times 3200 \times 1.69 \times 10^{-1} \times 10^3 \text{ kcal/}°C.$$
$$= 1.57 \text{ cal/}°C.$$

The heat capacity CM and heat capacity CS of the spheres are studied for the displacement of 500 cc. The heat capacities for unit area are calculated as follows.

2.71/500=5.42×10⁻³ for heat resisting alloy
1.57/500=3.14×10⁻³ for ceramics

Hence, the minimum heat capacity C of the pre-combustion chamber structure is 0.00314 cal/°C.·cm³ and the heat capacity of the pre-combustion chamber structure of this invention need only be greater than the minimum heat capacity C.

As to the surface area of the pre-combustion chamber structure, the surface area A of the sphere is $4\pi r^2$, which, from r=a=14.65 mm, results in A=2697 mm² =26.97 cm². Because the heat capacity CS of the $Si_3N_4$ sphere is 1.57 cal/°C., $\alpha$ (=heat capacity CS/surface area A) is given by 1.57/26.97=0.058 cal/°C.·cm²

Hence, in the pre-combustion chamber type engine, the heat capacity $\beta$ of the pre-combustion chamber structure per unit displacement and the heat capacity $\alpha$ of the pre-combustion chamber structure per unit surface area are as follows:

0.00314 cal/°C.·cm³ ≤ $\beta$ ≤ 0.035 cal/°C.·cm³

0.058 cal/°C.·cm² ≤ $\alpha$ ≤ 0.55 cal/°C.·cm²

The metal gasket as the damping ring can retain its function as a damper after long period of use. It can be formed U-shaped in cross section with an annular groove opening to the pre-combustion chamber side. The annular groove provided in the metal gasket can form an annular flow in the pre-combustion chamber between the upper member and the lower member, further strengthening the swirl of the annular air flow in the annular groove and promoting the mixing of the air and the unburned fuel mixture. This construction can produce a good air-fuel mixture thereby limiting the production of smoke during the combustion in the pre-combustion chamber.

Alternatively, by setting to 0.55 cal/°C.·cm² or lower the ratio between the sum of the heat capacities of the pre-combustion chamber material and the reinforcement ring and the inner surface area of the pre-combustion chamber exposed to the burning gas, it is possible to improve the net average effective pressure, i.e., thermal efficiency, and therefore fuel efficiency.

DETAILED DESCRIPTION OF THE PREFERRED EMBODIMENTS

Now, embodiments of the pre-combustion chamber type engine according to this invention will be described by referring to the accompanying drawings.

Figure 1:
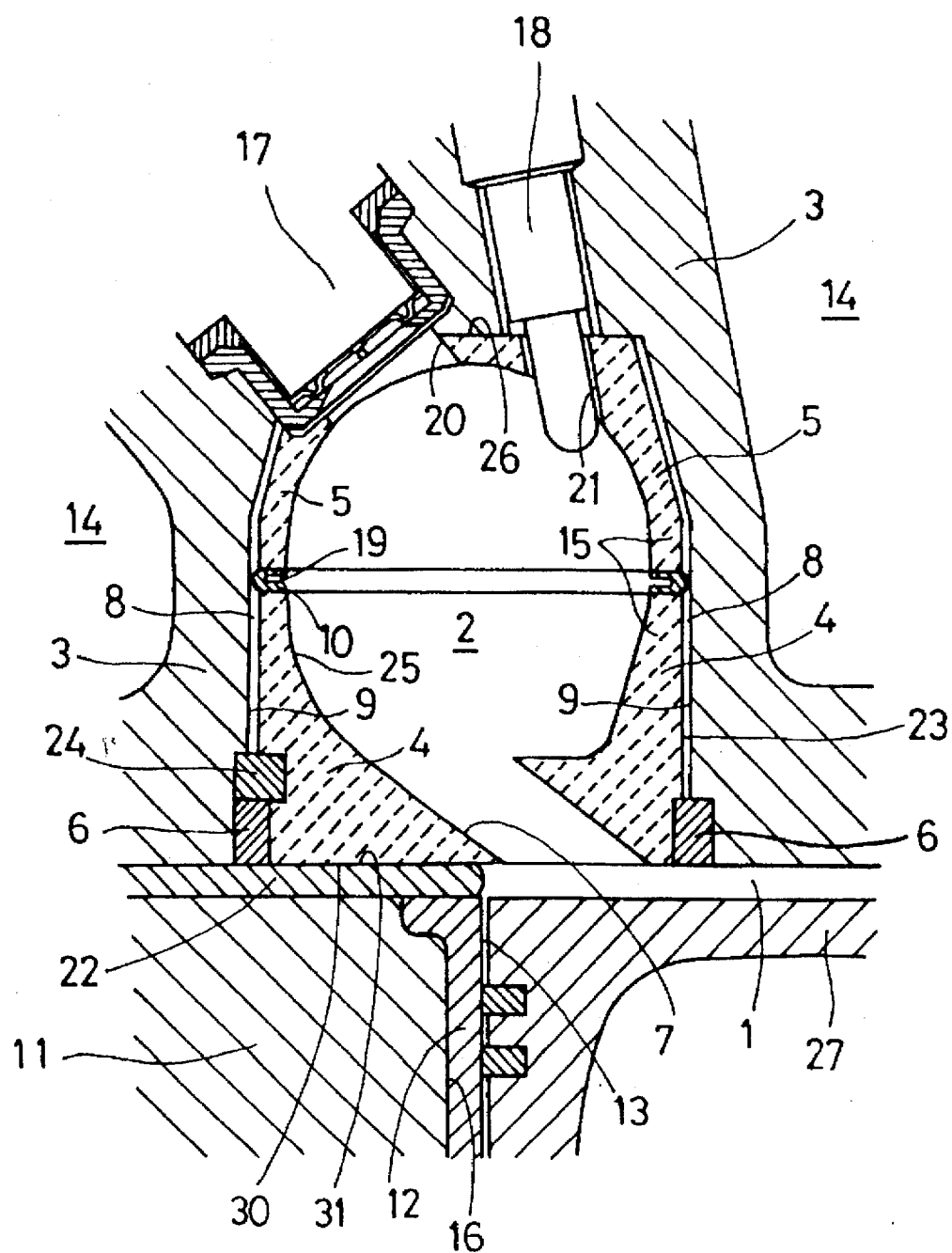
FIG. 1 is a cross section of the pre-combustion chamber type engine as a first embodiment of this invention, with a pre-combustion chamber provided in the cylinder head.

FIG. 1 shows one embodiment of the pre-combustion chamber type engine of this invention. This pre-combustion chamber type engine is a swirl chamber type, which includes a cylinder liner 12 fitted in a bore 16 of a cylinder block 11, a cylinder head 3 mounted to the cylinder block 11 with a gasket 22 therebetween, a pre-combustion chamber structure 15 having a heat insulation air layer 8 and fitted in a cavity 9 formed in the cylinder head 3, a fuel injection nozzle 17 to inject fuel into a pre-combustion chamber 2 or a swirl chamber in the diesel engine formed by the pre-combustion chamber structure 15, and a glow plug 18 installed in the pre-combustion chamber 2. The pre-combustion chamber structure 15 is made of a heat resisting ceramic material such as silicon nitride and is divided almost parallelly in a direction crossing the cylinder axis into two parts—an upper member 5 and a lower member 4 as a hot plug. The upper member 5 is formed with a fuel injection hole 20 through which the fuel from the fuel injection nozzle 17 is injected into the pre-combustion chamber 2, and when an insertion hole 21 for the glow plug 18. The lower member 4 is formed with a communication hole 7 communicating with the main combustion chamber 1 formed in the cylinder 13. In the cylinder 13 formed by the cylinder liner 12, a piston 27 reciprocates.

This pre-combustion chamber type engine has a damping ring 10 between the upper member 5 and the lower member 4 which has a capability of sealing between and/or damping the two members. The damping ring 10 is installed between the upper member 5 and the lower member 4 and is made of elastically or plastically deformable materials. The damping ring 10 is made of such materials as heat resisting metals and ceramics and is formed with an annular groove 19 that opens to the pre-combustion chamber 2 so that it is hollow on the inner side and U-shaped in cross section. The damping ring 10 has a damping function because of the annular groove 19 and at the same time produces an annular flow in the pre-combustion chamber 2. The lower member 4 is positioned with respect to the cylinder head 3 by a circumferential direction positioning member 24 and fixed to the cylinder head 3 by a fixing ring 6. The upper member 5 and the lower member 4 are formed of high-strength ceramic materials such as silicon nitride. The cylinder head 3 is formed with a water jacket 14 through which cooling water circulates.

In this pre-combustion chamber type engine, the pre-combustion chamber structure 15 made up of the upper member 5 and the lower member 4 is fixedly set and fitted in the cavity 9 of the cylinder head 3 in such a way that the circumferential outer surface 23 of the pre-combustion chamber structure 15 has a clearance fit relative to the wall surface of the cavity 9 or that the heat insulation air layer 8 is formed between the circumferential outer surface 23 of the pre-combustion chamber structure 15 and the wall surface of the cavity 9 to make the pre-combustion chamber 2 a heat insulating structure. With the cylinder head 3 secured to the cylinder block 11, the pre-combustion chamber structure 15 has the upper surface 26 of its upper member 5 pressed against the wall surface of the cavity 9 so that the pre-combustion chamber structure 15 is mounted in the cavity 9 of the cylinder head 3 immovably in the direction of cylinder shaft by the reactionary force of a gasket 22 and of a metal gasket 10 of the damping ring. In this case, a clearance may develop between the bottom surface 30 of the lower member 4 and the upper surface 31 of the gasket 22.

In the pre-combustion chamber type engine, to reduce and optimize the thermal energy dissipated from the pre-combustion chamber 2 through the cylinder head 3 and thereby improve the net average effective pressure or thermal efficiency, the ratio $\beta$ of the heat capacity C (cal/°C.) of the pre-combustion chamber structure 15 to the displacement x (cm$^3$) per cylinder in the engine is set not greater than 0.035 cal/°C.·cm$^3$.

That is, 0.00314 cal/°C.·cm$^3 \leq \beta \leq 0.035$ cal/°C.·cm$^3$

In this pre-combustion chamber type engine, the reason that the fuel efficiency can be improved by reducing the heat capacity of the pre-combustion chamber structure 15 is as follows. The following applies both to the pre-combustion chamber structure 15 formed as a one-piece integral structure and the one formed as a two-part structure made up of the upper member 5 and the lower member 4.

In the pre-combustion chamber type engine, the compression ratio cannot be set so that the heat efficiency (net average effective pressure) is maximum, because it is necessary to secure the cold start capability. Increases in the cylinder inner wall surface temperature and the compression end temperature during the cold start are explained by referring to FIG. 15. When the engine is stared by the starter, the air in the cylinder is adiabatically compressed to a high temperature. At this time, because the pre-combustion chamber inner wall before starting has the same temperature as the open air, i.e., low temperature, heat is transferred from the compressed air to the pre-combustion chamber inner wall in an amount corresponding to the temperature difference by which the temperature $t_g$ (°C.) of the air compressed by piston is higher than the temperature $t_w$ (°C.) of the pre-combustion chamber inner wall (temperature difference $\Delta T$=compressed air temperature $t_g$–pre-combustion chamber inner wall temperature $t_w$). Because the compressed air temperature $t_g$ changes according to the crank angle, the difference $\Delta T$ changes momentarily.

The amount of heat transferred Q (kcal/h) is $Q = \alpha_g \cdot F(t_g - t_w)$ where $\alpha_g$ is a heat transfer coefficient (kcal/m$^2$·h·°C.) and F is an area (m$^2$).

When the crank advances to an arbitrary rotation angle during the first rotation after starting, the pre-combustion chamber inner wall temperature is at the same temperature as the outside air, so that the pre-combustion chamber wall receives the amount of heat corresponding to the temperature difference between it and the compressed air, resulting in a slight increase in the pre-combustion chamber inner wall temperature. At the next moment when the crank angle advances by a very small amount, the temperature of the air, which is being adiabatically compressed, further rises. The amount of heat that the pre-combustion chamber receives at this time is equal to only the temperature difference between the then pre-combustion chamber temperature (which has already increased slightly) and the then air temperature. In this way, the crank finishes one complete rotation, causing the temperature of the pre-combustion chamber inner wall to rise slightly (so does the inner wall of other than the pre-combustion chamber).

During the next crank rotation or second rotation, the amount of heat transferred to the pre-combustion chamber is determined by the temperature difference between the pre-combustion chamber temperature that has increased slightly and the elevated temperature of the compressed air. The amount of heat transferred changes every moment because the temperature of the air being compressed changes according to the crank rotation angle. The pre-combustion chamber progressively increases in temperature as it repetitively receives heat from the compressed air for each cycle. As the temperature of the pre-combustion chamber (including the inner wall of other than the pre-combustion chamber) increases, the temperature difference between the compressed air and the pre-combustion chamber becomes small, reducing the heat flow or heat dissipation from the compressed air to the pre-combustion chamber, causing the in-cylinder compression crank temperature at the same crank angle to continue to rise. When the in-cylinder compression crank temperature reaches the ignition temperature (which, when there is an assist of the glow plug, is reduced by the corresponding temperature), the engine is started by ignition.

Figure 8:
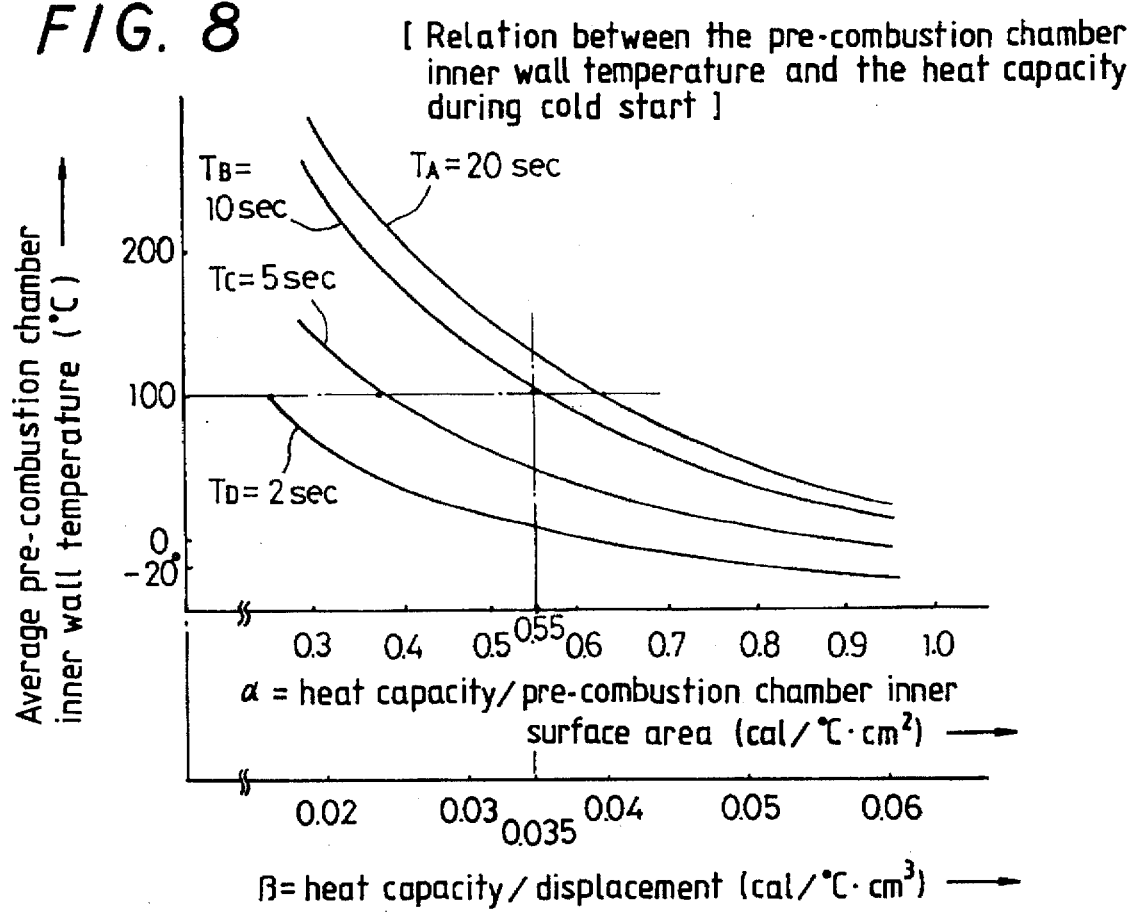
FIG. 8 is a diagram showing the relation between a pre-combustion chamber inner wall temperature, a ratio of heat capacity to displacement, and a ratio of heat capacity to internal surface area of the pre-combustion chamber in the pre-combustion chamber-type engine during cold starting.
Figure 9:
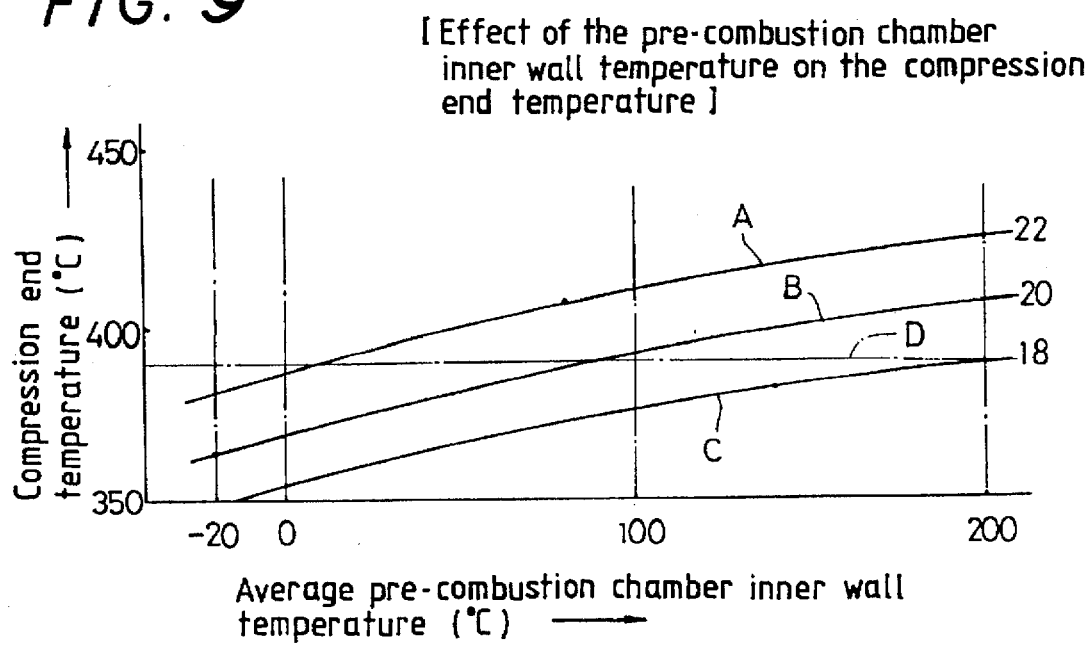
FIG. 9 is a diagram showing the effect the pre-combustion chamber inner wall temperature has on the compression end temperature.
Figure 15:
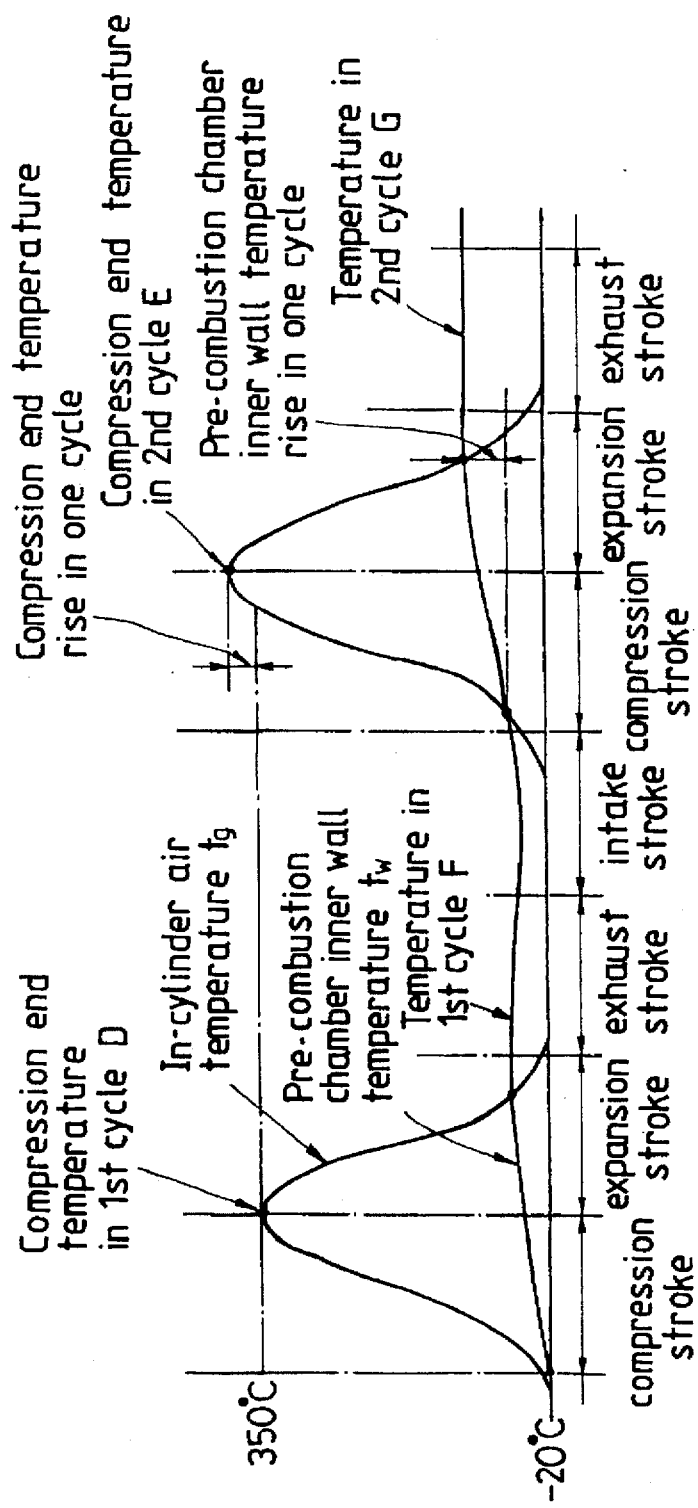
FIG. 15 is a diagram showing the relation between the in-cylinder air temperature and the pre-combustion chamber inner wall temperature during staring cycles of the diesel engine.

Although FIG. 15 exaggerates the temperature rises of the compression end temperature $t_g$ and the pre-combustion chamber inner wall temperature $t_w$ in the cylinder for the purpose of explanation, the temperature rises in one cycle can be calculated from FIG. 8 and 9. It is understood from the above that FIG. 9 is obtained by connecting the point D and E in FIG. 15 and that FIG. 8 is produced by connecting the curve F and G of FIG. 15.

As described above, the air temperature at compression end and the pre-combustion chamber inner wall temperature increase. And what needs attention here is how many degrees the heat transferred from the compressed air to the pre-combustion chamber inner wall causes the temperature of the pre-combustion chamber inner wall to rise. It is natural that the smaller the heat capacity of the pre-combustion chamber, the greater the temperature rise of the pre-combustion chamber inner wall will be for the same amount of heat received. If the pre-combustion chamber is assembled in the cylinder head using the press fitting, the heat flows not only to the pre-combustion chamber but to the cylinder head as well, so that the heat capacity of the pre-combustion chamber becomes larger than it appears to be, making it harder for the temperature of the pre-combustion chamber to rise. Therefore, only when the pre-combustion chamber is made small in heat capacity and is thermally isolated as much as possible from the cylinder head, can the temperature rise accelerate.

Figure 14:
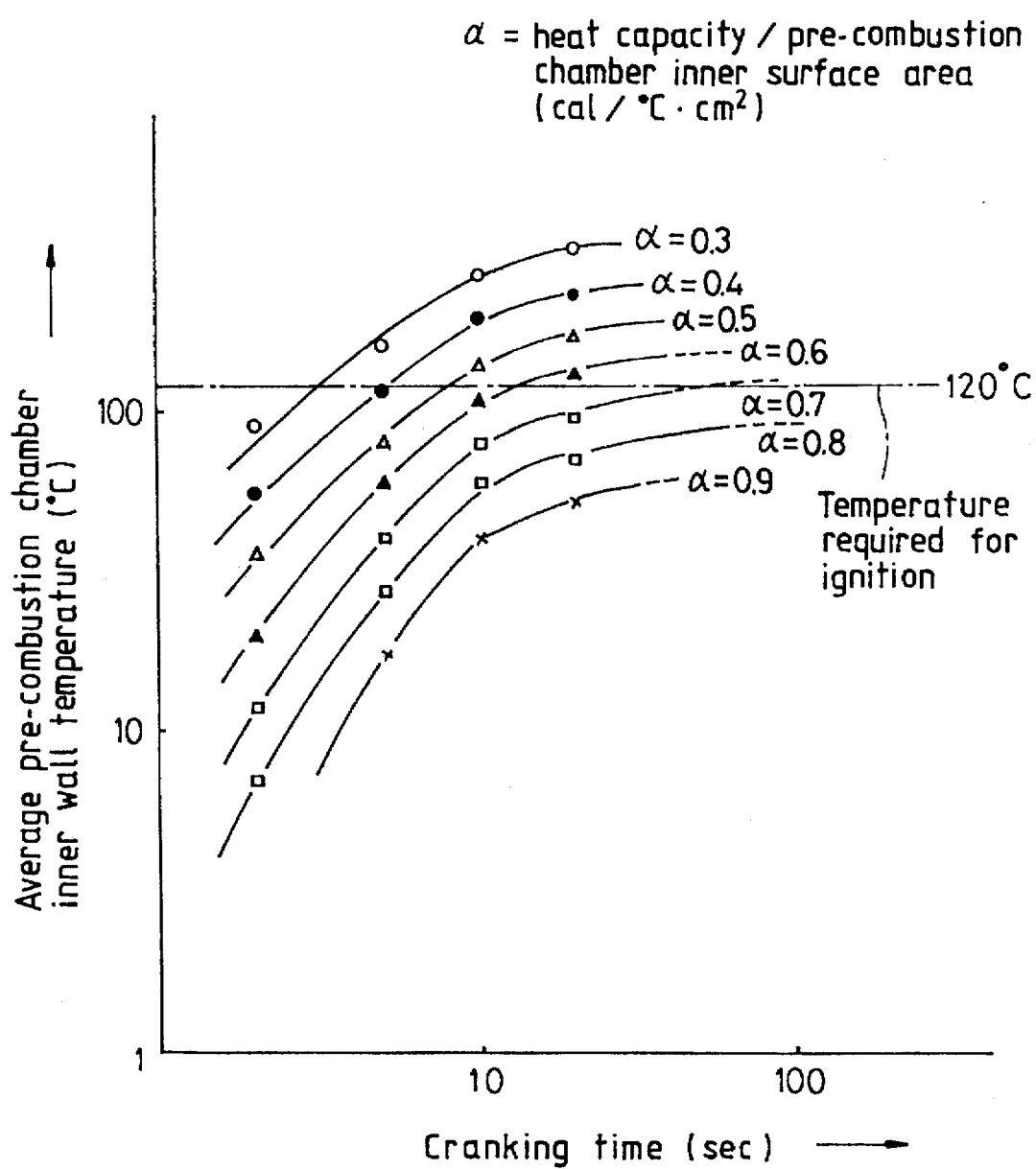
FIG. 14 is a diagram showing the relation between the cranking time at starting and the average pre-combustion chamber inner wall temperature in the diesel engine.

The diesel engine uses the glow plug 18 as a start assist device to secure reliable starting. Because the temperature rise becomes moderate after 10 seconds of cranking, as shown in FIG. 14, the limit of the cranking time is 10 seconds. When the cranking time in excess of 10 seconds is required, it is decided that the engine will not start.

FIG. 9 shows a graph showing the effect that the pre-combustion chamber inner wall temperature has on the compression end temperature. In FIG. 9, the average temperature °C. of the pre-combustion chamber inner wall is plotted along the abscissa and the compression end temperature °C. is plotted along the ordinate. FIG. 9 shows the compression end temperature °C. in the engine with a displacement per cylinder of 500 cc and a cranking revolution of 280 rpm, and also characteristic curves when the glow plug 18 is on and the engine is started with the cranking tame of less than 10 seconds. The curve A represents the compression ratio of 22.0, the curve B represents the compression ratio of 20.0 and the curve C represents the compression ratio of 18.0. It is seen that the compression end temperature required for ignition is about 390° C.

FIG. 8 is a diagram showing the relation between the pre-combustion chamber inner wall temperature and the heat capacity during cold starting of an engine which has the displacement per cylinder of 500 cc and the cranking revolution of 280 rpm. The abscissa represents the ratio of heat capacity cal/°C. of the pre-combustion chamber 2 to the displacement $cm^3$ per cylinder, cal/°C.·$cm^3$, and the ordinate represents the average pre-combustion chamber inner wall temperature °C. In this pre-combustion chamber type engine, if the compression ratio is set to 19.5 as opposed to the normal ratio of 21.5 to make it closer to the optimum compression ratio, the internal wall temperature of the pre-combustion chamber 2 must be 100° C. or higher. As indicated by the curve $T_B$, the heat capacity for which the internal wall temperature reaches 100° C. within 10 seconds of cranking is 0.035 cal/°C. The curve $T_A$ represents the relation between the internal wall temperature and the heat capacity after 20 seconds of cranking; the curve $T_C$ represents the relation after 5 seconds of cranking; and $T_D$ represents the relation after 2 seconds of cranking.

Figure 10:
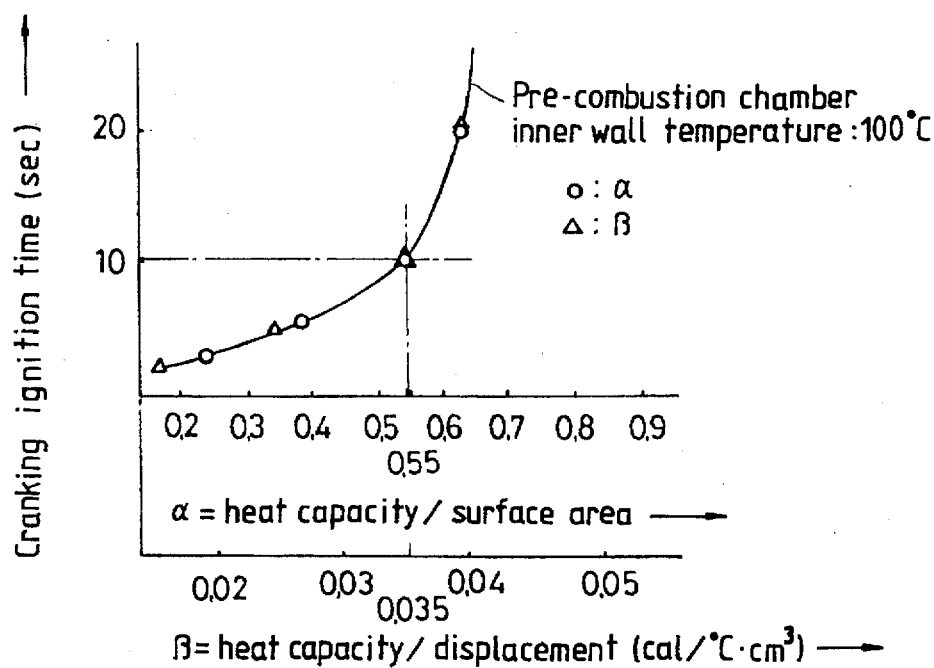
FIG. 10 is a diagram showing the relation between a cranking ignition time, a ratio of heat capacity to displacement, and a ratio of heat capacity to internal surface area of the pre-combustion chamber in the pre-combustion chamber-type engine when the pre-combustion chamber inner wall temperature is 100° C.
Figure 11:
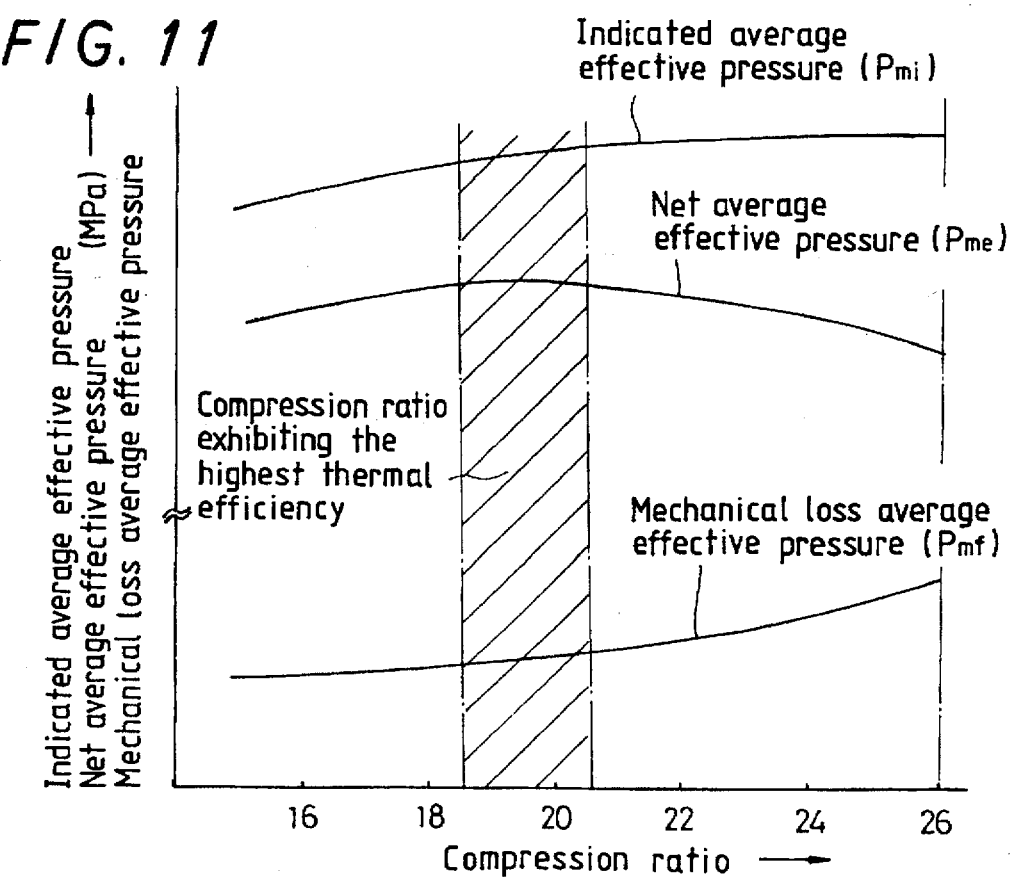
FIG. 11 is a diagram showing the relation, with respect to a compression ratio, of an indicated average effective pressure, a net average effective pressure and a mechanical loss average effective pressure in the pre-combustion chamber type engine.

Next, in the engine with the displacement per cylinder of 500 cc and the cranking revolution of 280 rpm, the relation between the cranking time required for the average pre-combustion chamber inner wall temperature °C. to reach 100° C. and the heat capacity is shown in FIG. 10. FIG. 10 is a diagram showing the relation between the cranking time during cold starting, the ratio of heat capacity to displacement and the ratio of heat capacity to pre-combustion chamber inner surface area. The abscissa represents the ratio of the capacity of pre-combustion chamber 2 cal/°C. to the displacement $cm^3$ per cylinder (cal/°C.·$cm^3$). The ordinate represents the cranking time. If the cranking time is supposed to be 10 seconds, the pre-combustion chamber inner wall temperature ° C is 100° C. when the ratio β (=C/x) of the heat capacity C (cal/°C.) of pre-combustion chamber 2 to the displacement x ($cm^3$) per cylinder is 0.035 cal/ °C.·$cm^3$. Hence, if the cranking time is 10 seconds or less, β is given as follows.

$$0.00314 \text{ cal/°C.·} cm^3 \leq \beta \leq 0.035 \text{ cal/°C.·} cm^3$$

Figure 12:
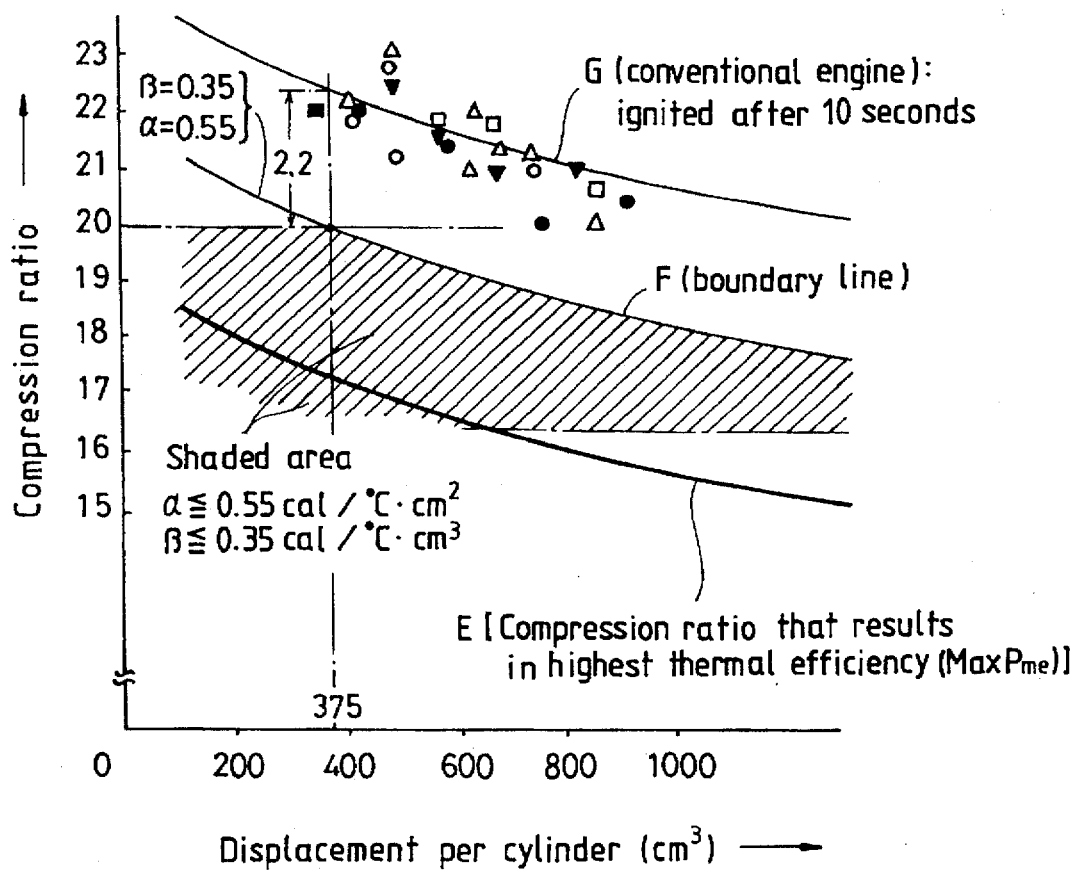
FIG. 12 is a diagram showing the relation between displacement per cylinder and compression ratio for the pre-combustion chamber type diesel engine and the direct injection type diesel engine.
Figure 13:
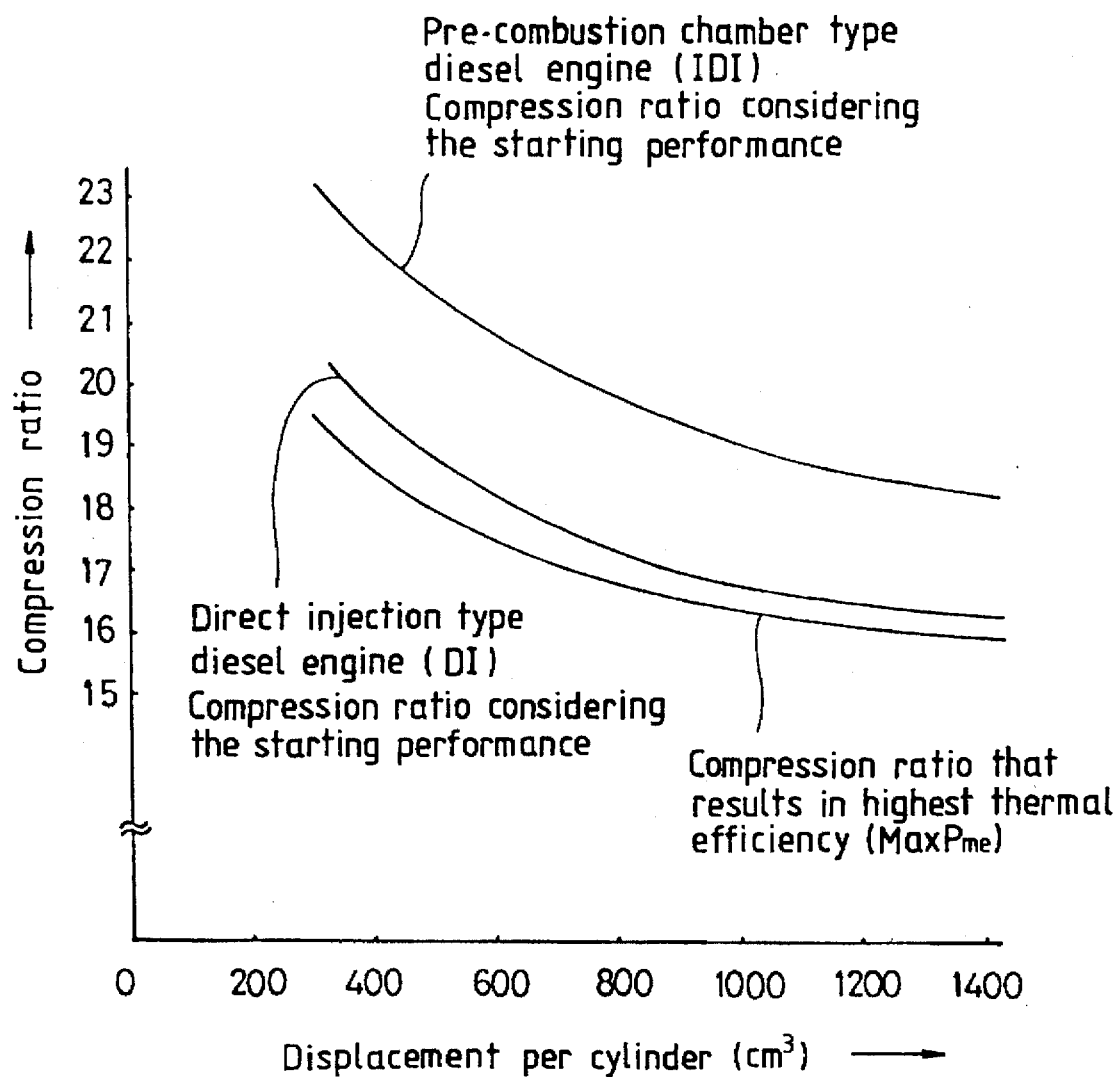
FIG. 13 is a diagram showing the relation between displacement and compression ratio for the pre-combustion chamber type diesel engine and the direct injection type diesel engine.

FIG. 12 indicates that this pre-combustion chamber type engine can be started with a lower compression ratio than that of the conventional pre-combustion chamber type diesel engine. That is, verified from the result of the pre-combustion chamber type engine tests that, with the ratio of the heat capacity of the pre-combustion chamber 2 to the per-cylinder displacement set at 0.035 cal/°C.·$cm^3$, the relation between the compression ratio and the per-cylinder displacement, in which the pre-combustion chamber inner wall temperature °C. reaches 100° C. within 10 seconds of cranking, can be demarcated at the boundary by the curve F. It is also found that the boundary line F can be approximated by the following equation using the compression ratio y and the non-dimensional number of displacement x:

$$y=0.03579^z-2.2$$

where $Z=1/(0.01029x^{1/3}-1)$, the test results of the pre-combustion chamber type engine also found that the compression ratio with respect to the per-cylinder displacement that provides the best heat efficiency is expressed by the curve E.

Next, another embodiment of the pre-combustion chamber type engine according to this invention is described. By referring to FIG. 1, the next embodiment of the pre-combustion chamber type engine is explained. This embodiment considers the ratio between the heat capacity of the pre-combustion chamber structure 15 and the inner surface area of the pre-combustion chamber exposed to the burning gas. In order to reduce and optimize the thermal energy dissipated from the pre-combustion chamber 2 through the cylinder head 3 to lower the compression ratio and reduce the mechanical loss, thereby improving the net average effective pressure or heat efficiency, the ratio α (=C/A) of the heat capacity C (cal/°C.) of the pre-combustion chamber structure 15 to the surface area A ($cm^2$) of the inner wall surface 25 of the pre-combustion chamber 2 exposed to the burning gas is set to 0.55 cal/°C.·$cm^2$ or less, as shown in FIG. 8 and 10. That is, $$0.058 \text{ cal/°C.·} cm^2 \leq \alpha \leq 0.55 \text{ cal/°C.·} cm^2$$

The reason that the fuel efficiency of the pre-combustion chamber-type engine can be improved by lowering the heat capacity of the pre-combustion chamber structure 15 is as follows. The increases in the cylinder inner wall surface temperature and the compression end temperature during cold starting have been explained above by referring to FIG.

15. FIG. 8 is a diagram showing the relation between the pre-combustion chamber inner wall temperature and the heat capacity during the cold starting of an engine with a per-cylinder displacement of 500 cc and a cranking revolution of 280 rpm. The abscissa represents the ratio of the heat capacity cal/°C. to the surface area cm² of the inner wall of the pre-combustion chamber 2, and the ordinate represents the average pre-combustion chamber inner wall temperature °C. In this embodiment, the above explanation on the ratio between the displacement and the heat capacity also applies. That is, if the compression ratio is set to 20 as opposed to the normal ratio of 22 to bring the compression ratio closer to the optimum one, the inner wall temperature of the pre-combustion chamber 2 needs to be about 100° C. As indicated by the curve $T_B$, the heat capacity for which the inner wall temperature reaches 100° C. within 10 seconds of cranking is $\alpha$=0.55 cal/°C.·cm².

Next, in the engine with a per-cylinder displacement of 500 cc and a cranking revolution of 280 rpm, the cranking time that will raise the average pre-combustion chamber inner wall temperature °C. to 100° C. is shown related to the heat capacity in FIG. 10. If the cranking time is 10 seconds, the graph indicates that for the pre-combustion chamber inner wall temperature °C. to reach 100° C., the ratio $\alpha$ (=C/A) between the surface area A (cm²) of the inner wall of the pre-combustion chamber 2 and the heat capacity C (cal/°C.) needs to be 0.55 cal/°C.·cm². Therefore, when the cranking time is 10 seconds or less, $\alpha$ is given by $$0/058\ cal/°C.·cm^2 \leqq \alpha \leqq 0.55\ cal/°C.·cm^2$$

It is seen from FIG. 12 that the pre-combustion chamber type engine can be started with a lower compression ratio than the conventional pre-combustion chamber type diesel engine. That is, the result of tests on the pre-combustion chamber type engine has shown that, with the ratio of the heat capacity to the surface area of the inner wall of the pre-combustion chamber 2 set at 0.55 cal/°C.·cm², the relation between the compression ratio and the surface area of the inner wall of the pre-combustion chamber 2, in which the pre-combustion chamber inner wall temperature °C. reaches 100° C. within 10 seconds of cranking, can be demarcated at the boundary by the curve F, as in the preceding case of the displacement. The boundary curve F can be approximated as follows by using the compression ratio y and the non-dimensional number of the inner surface area of the pre-combustion chamber s.

$$y=0.03579^z-2.2$$

where $Z=1/(-0.01029s^{1/3}-1)$. The test results of the pre-combustion chamber type engine also found that the compression ratio with respect to the per-cylinder displacement that provides the best heat efficiency is expressed by the curve E, as in the preceding case of displacement.

Figure 2:
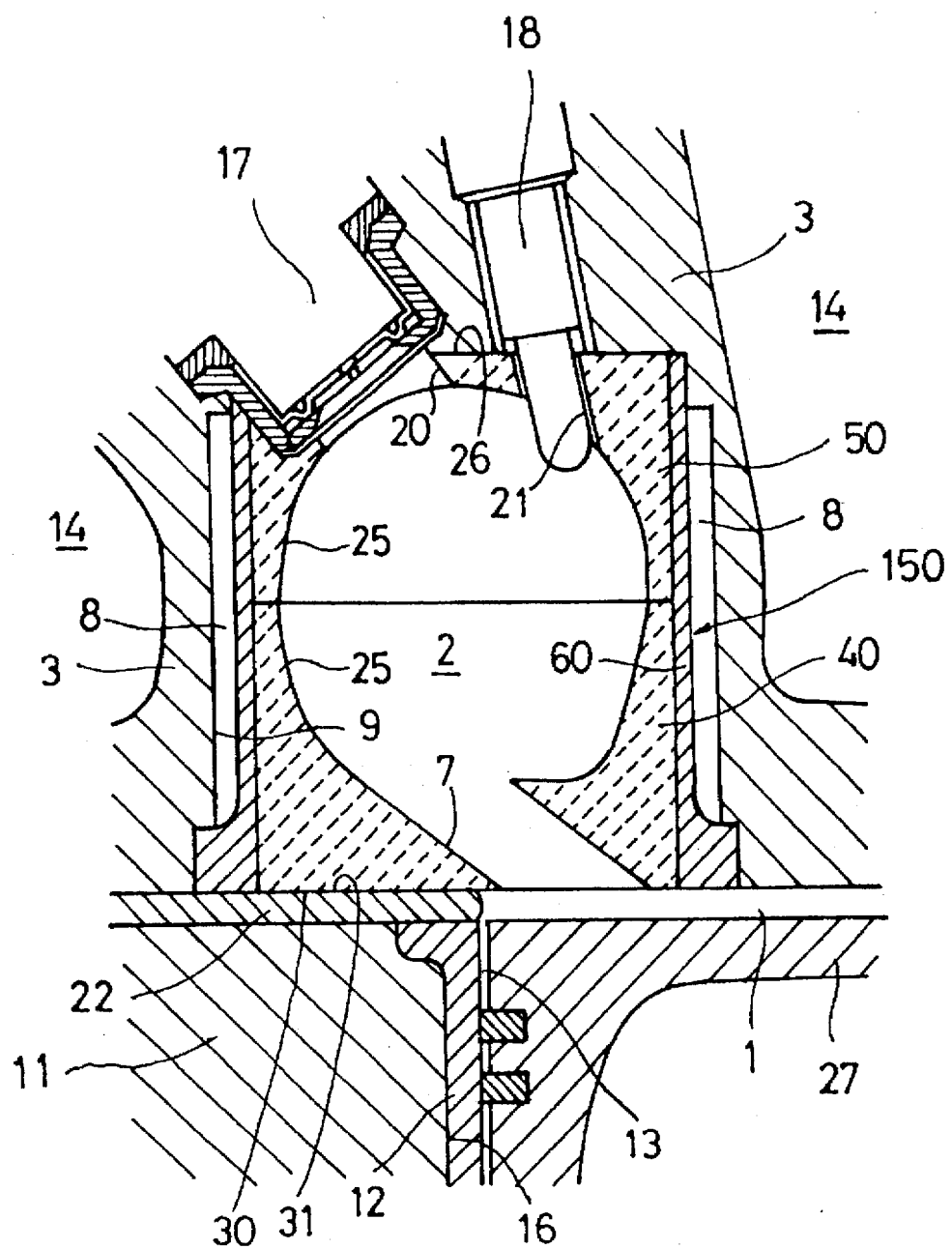
FIG. 2 is a cross section of the pre-combustion chamber type engine as another embodiment of this invention, with a pre-combustion chamber provided in the cylinder head.

Next, still another embodiment of the pre-combustion chamber type engine according to this invention is described by referring to FIG. 2. In FIG. 2, members identical to those of FIG. 1 are given like reference numerals and their explanations omitted. In this embodiment, the pre-combustion chamber structure 150 comprises: an upper member 50 as an inner wall member made of heat resisting ceramic material such as silicon nitride and formed with a fuel injection hole 20 through which to inject fuel from a fuel injection nozzle 17 into the pre-combustion chamber 2 and with an insertion hole 21 for a glow plug 18; a lower member 40 as an inner wall member made of heat resisting ceramic material such as silicon nitride and formed with a communication hole 7 communicating with the main combustion chamber 1 in the cylinder 13; and a reinforcement ring 60 made of heat resisting metal such as SUS fitted over the outer circumference of the upper member 50 and the lower member 40. With the pre-combustion chamber structure 150 installed in the cavity 9 formed in the cylinder head 3, there is formed a heat insulation air layer 8 between the outer circumferential surface of the reinforcement ring 60 and the wall surface of the cavity 9. In this case, the pre-combustion chamber structure 150 may be a structure divided into the upper member 50 and the lower member 40 or may be an integral structure having the upper member 50 and the lower member 40 formed as one piece. The reinforcement ring 60 is shrinkage-fitted over the outer circumference of the upper member 50 and the lower member 40, both forming the inner wall member, to apply compression stress to the upper and lower members 50, 40 made of ceramics. Alternatively, the reinforcement ring 60 is fitted, by casting, over the outer circumference of the upper member 50 and the lower member 40, both forming the inner wall member, so that construction caused by cooling applies compression stresses to the upper and lower members 50, 40 of ceramics material. In this embodiment, the ratio $\beta$ (=C/x) of the heat capacity C of the pre-combustion chamber structure 150—the sum of the heat capacity of the upper and lower members 50, 40 forming the inner wall member and the heat capacity of the reinforcement ring 60—to the per-cylinder displacement x (cm³) is set at 0.035 cal/°C.·cm³ or lower.

The ratio $\beta$ is optimized as follows $$0.00314\ cal/°C.·cm^3 \leqq \beta \leqq 0.035\ cal/°C.·cm^3$$

Alternately, in this pre-combustion chamber type engine, the ratio $\alpha$ (=C/A) of the heat capacity C of the pre-combustion chamber structure 150 to the surface area A (cm²) of the inner surface 25 of the pre-combustion chamber 2 is set at 0.55 cal/°C.·cm² or lower. That is, $$0.058\ cal/°C.·cm^2 \leqq \alpha \leqq 0.55\ cal/°C.·cm^2$$

Figure 3:
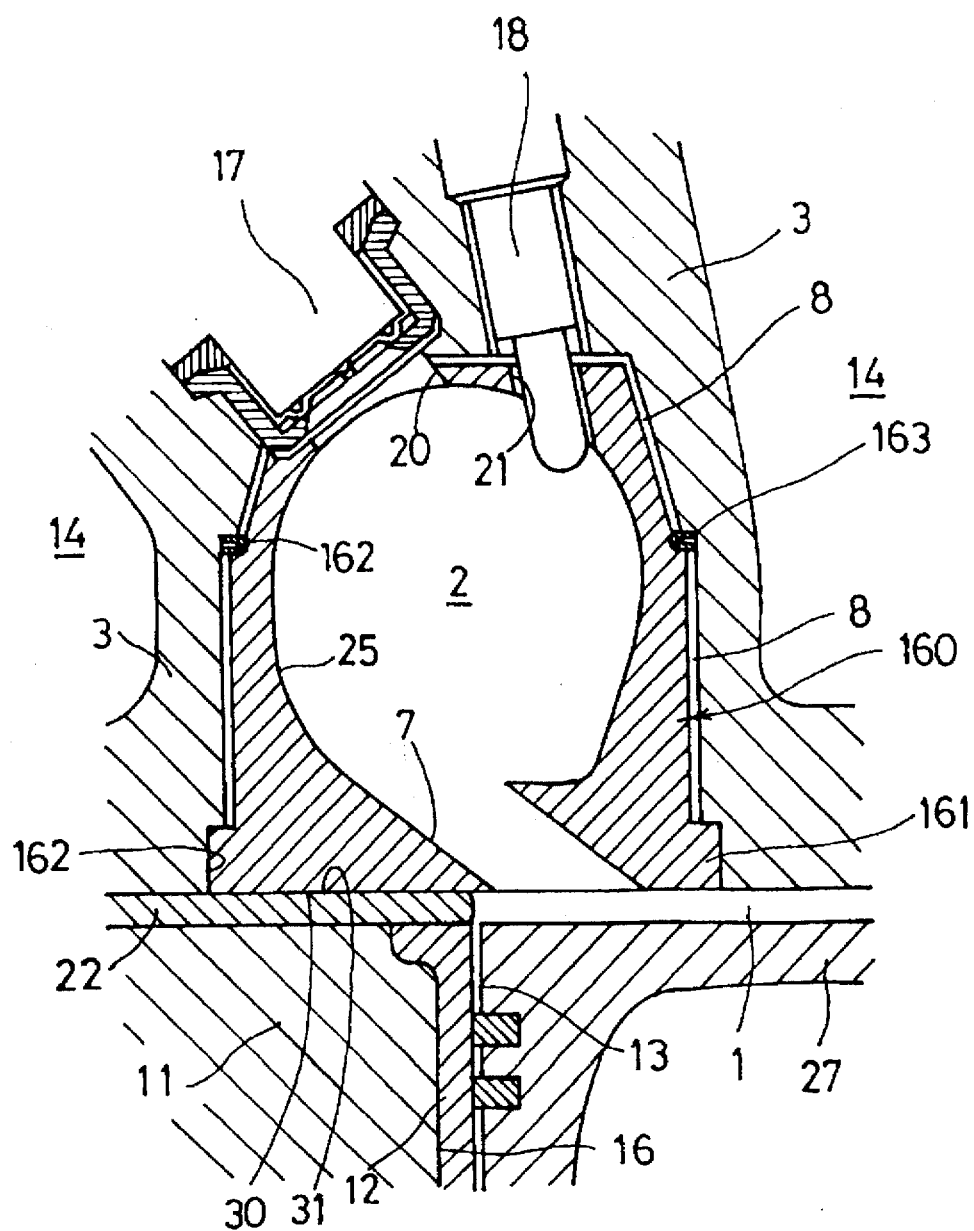
FIG. 3 is a cross section of the pre-combustion chamber type engine as still another embodiment of this invention, with a pre-combustion chamber provided in the cylinder head.

Next, a further embodiment of the pre-combustion chamber type engine according to this invention is described by referring to FIG. 3. In FIG. 3, members identical with those of FIG. 1 are assigned like reference numerals and their explanations omitted. In this embodiment, the pre-combustion chamber structure 160 is made of a heat resisting metal such as SUS and a flange portion 161 formed at the lower part thereof is fitted under pressure into a groove or stepped portion 162 formed in the cylinder head 3, with a heat insulation air layer 8 formed between the outer circumferential surface of other than the flange portion 161 and wall surface of the cavity 9. In the embodiment of FIG. 3, the stepped portion 162 is formed at an intermediary portion of the pre-combustion chamber structure 160. A metal gasket 163 made of a material, which is elastically deformable and a partly plastically deformable, is interposed between the stepped portion 162 and the wall surface of the cavity 9. The pre-combustion chamber structure 160, though it is formed as a one-piece structure in the embodiment of FIG. 3, may be formed in upper and lower portions or left and right portions which may be Joined together by welding. The pre-combustion chamber structure 160 formed in this way has the ratio $\beta$ (=C/x) of the heat capacity C to the displacement x (cm³) per cylinder set to 0.035 cal/°C.·cm³ or lower. That is, $$0.00314\ cal/°C.·cm^3 \leqq \beta \leqq 0.035\ cal/°C.·cm^3$$

Alternatively, in the pre-combustion chamber type engine, the ratio $\alpha$ (=C/A) of the heat capacity C of the pre-combustion chamber structure 160 to the surface area A (cm²) of the inner wall surface 25 of the pre-combustion chamber 2 is set to 0.55 cal/°C.·cm² or lower. That is $$0.058 \text{ cal/°C.·cm}^2 \leq \alpha \leq 0.55 \text{ cal/°C.·cm}^2$$

Figure 4:
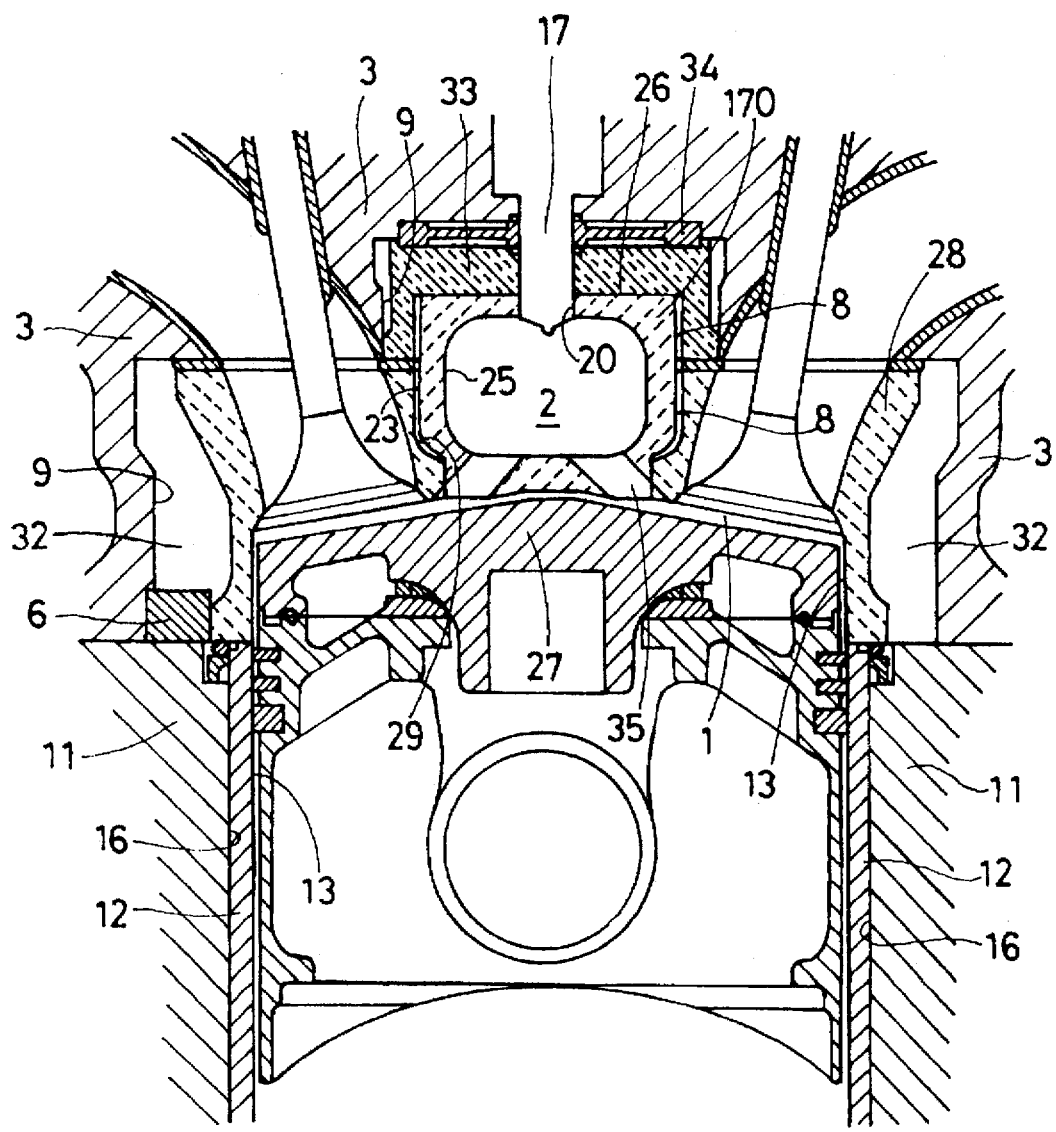
FIG. 4 is a cross section of the pre-combustion chamber type engine as a further embodiment of this invention, with a pre-combustion chamber provided in the cylinder head.

Next, a further embodiment of the pre-combustion chamber type engine according to this invention is described by referring to FIG. 4. In FIG. 4, members identical with those of FIG. 1 are assigned like reference numerals and their explanations omitted. In this embodiment, the pre-combustion chamber structure 170 is made of a heat resisting metal such as SUS, or ceramics. A head liner 28 is secured in the cavity 9 formed in the cylinder head 3 by a fixing ring 6. The pre-combustion chamber structure 170 is fitted in a mounting hole 29 formed in nearly the center of the head liner 28. A heat insulation air layer 8 is formed between the wall surface of the mounting hole 29 of the head liner 28 and the outer circumferential surface of the pre-combustion chamber structure 170 to make the pre-combustion chamber 2 a heat insulating structure. In the embodiment of FIG. 4, the head liner 28 is installed in the cavity 9 in the cylinder head 3 with a heat insulating air layer 32 formed therebetween. The head liner 28 is made of a heat resisting material such as ceramics and consists of a head underside portion and a liner upper portion, integrally formed in one piece. The head liner 28 is formed with a mounting hole 29, in which the pre-combustion chamber structure 170 is fitted. The pre-combustion chamber structure 170 is installed in the cavity 9 of the cylinder head 3 with heat insulating members 33, 34 interposed therebetween. The pre-combustion chamber structure 170 is formed with communication holes 35 that communicate the main combustion chamber 1 and the pre-combustion chamber 2. In the pre-combustion chamber structure 170 constructed in this way, the ratio β (=C/x) of the heat capacity C to the displacement x (cm³) per cylinder is set to 0.035 cal/°C.·cm³ or lower. That is, $$0.00314 \text{ cal/°C.·cm}^3 \leq \beta \leq 0.035 \text{ cal/°C.·cm}^3$$

Alternatively, in this pre-combustion chamber type engine, the ratio α (=C/A) of the heat capacity C of the pre-combustion chamber structure 170 to the surface area A (cm²) of the inner wall surface 25 of the pre-combustion chamber 2 exposed to the burning gas is set to 0.55 cal/°C.·cm² or lower. That is, $$0.058 \text{ cal/°C.·cm}^2 \leq \alpha \leq 0.55 \text{ cal/°C.·cm}^2$$

Figure 5:
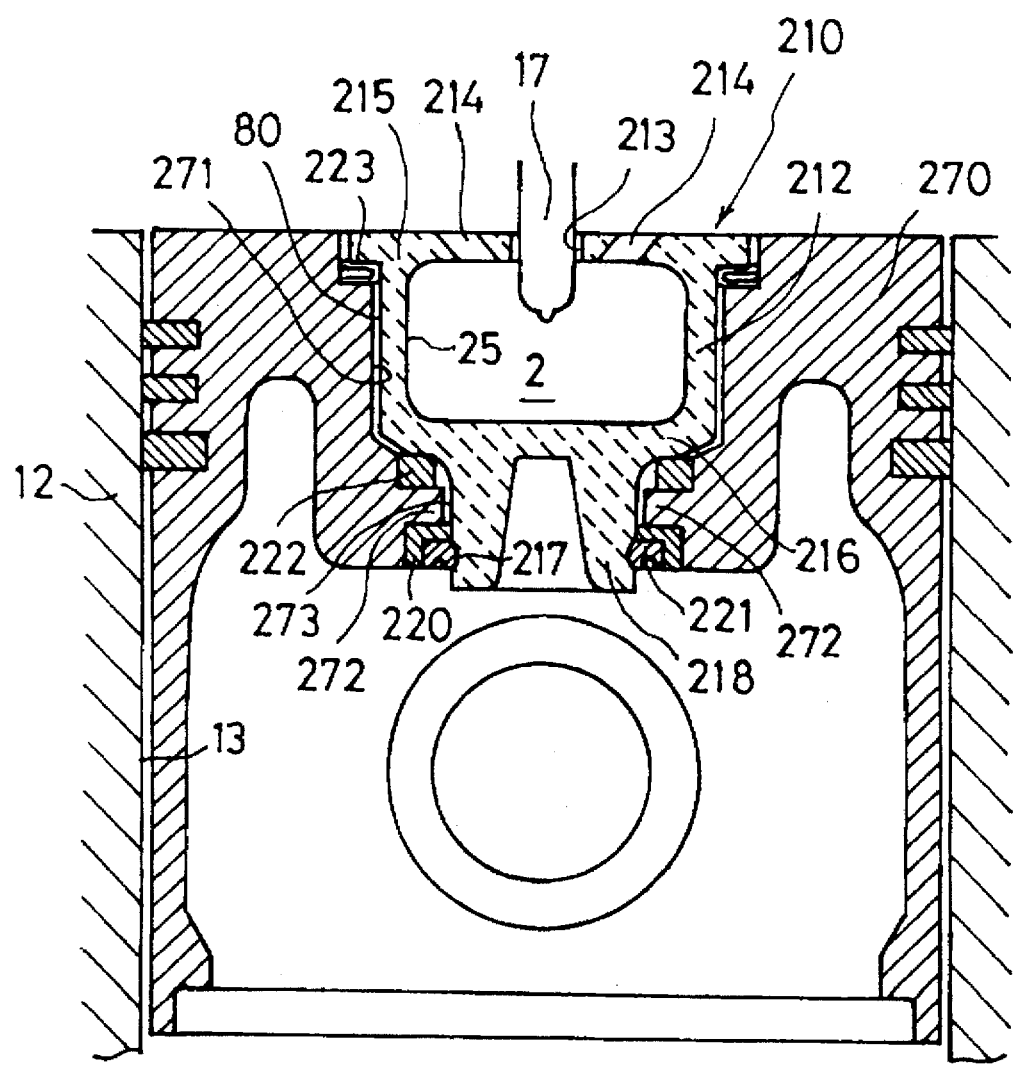
FIG. 5 is a cross section of the pre-combustion chamber type engine as a further embodiment of this invention, with a pre-combustion chamber provided in the piston.
Figure 6:
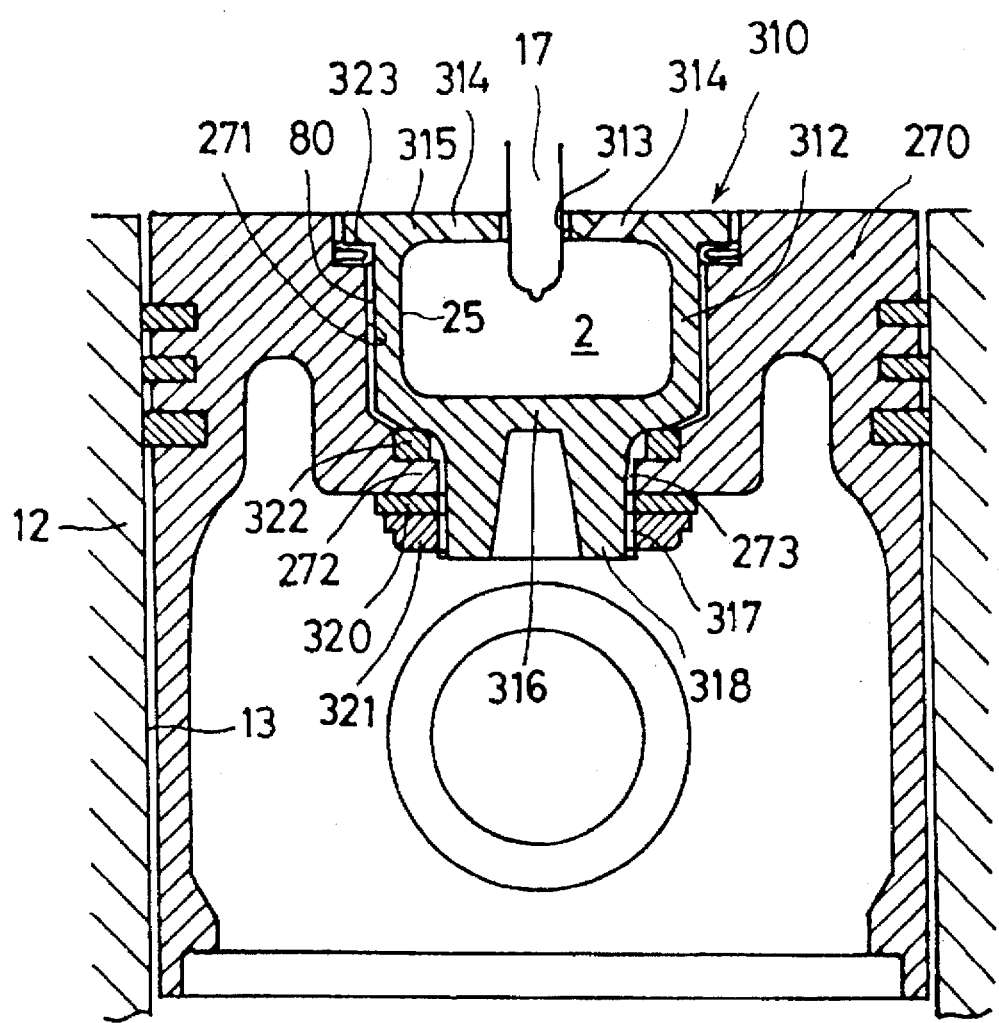
FIG. 6 is a cross section of the pre-combustion chamber type engine as a further embodiment of this invention, with a pre-combustion chamber provided in the piston.
Figure 7:
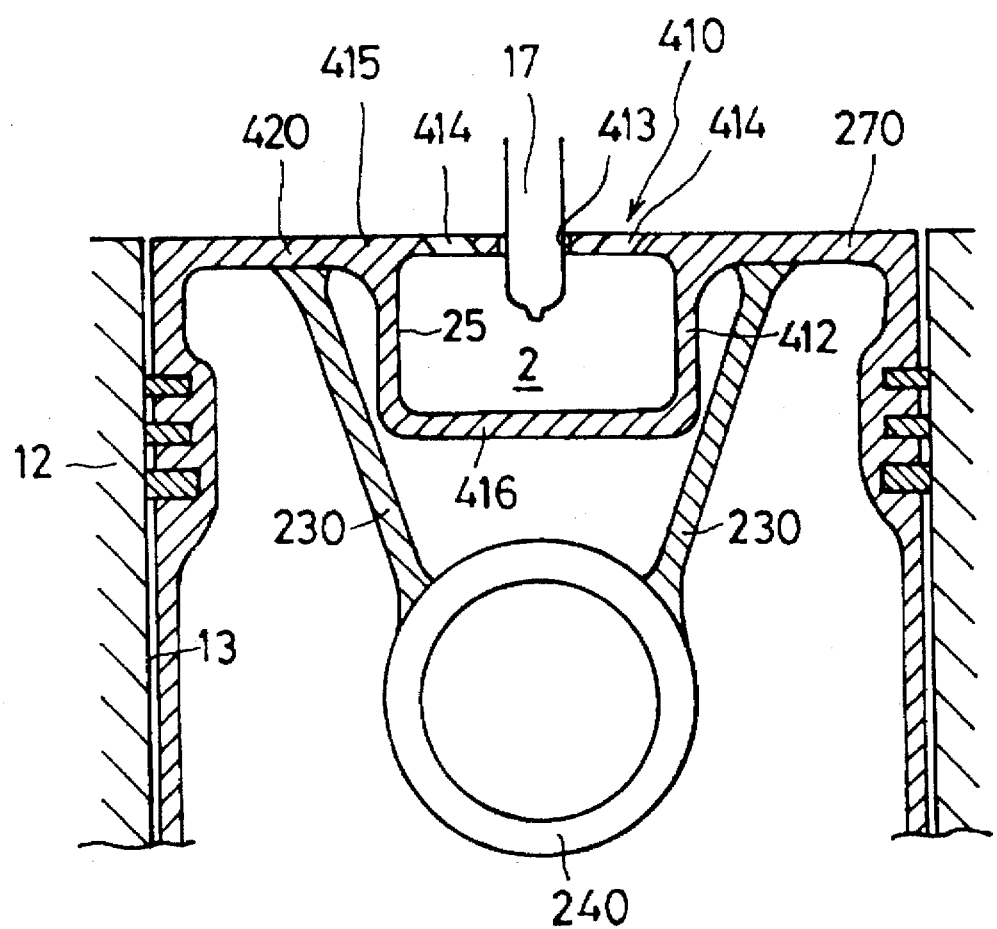
FIG. 7 is a cross section of the pre-combustion chamber type engine as a further embodiment of this invention, with a pre-combustion chamber provided in the piston.

Next, further embodiments of the pre-combustion chamber type engine are explained by referring to FIG. 5, 6 and 7. These embodiments apply the pre-combustion chamber type engine of this invention to pistons, which have a pre-combustion chamber structure formed therein.

In the embodiment of the pre-combustion chamber type engine shown in FIG. 5, a piston 270 installed reciprocally movable in the cylinder 13 formed by a cylinder liner 12 has a pre-combustion chamber structure 210 that forms the pre-combustion chamber 2. The pre-combustion chamber structure 210 includes a circumferential wall portion 212; an upper wall portion 215 that closes the top surface of the circumferential wall portion 212 and which has a hole 213 into which a fuel injection nozzle 17 is fitted and communication holes 214 for communicating the pre-combustion chamber 2 and the main combustion chamber; a lower wall portion 216 that closes the bottom surface of the circumferential wall portion 212; and a mounting portion 218 provided to the lower wall portion 216 and having a groove 217 formed in the outer circumference of the lower end of the mounting portion 218. These portions are formed in one piece of a heat resisting ceramics such as silicon nitride. The pre-combustion chamber structure 210 thus constructed is installed in the cavity 271 formed in the piston 270 with a heat insulation air layer 80 formed therebetween. A mounting portion 218 of the pre-combustion chamber structure 210 is inserted into a hole 273 formed in a bottom wall 272 of the cavity 271. A metal flow joining member 221 is arranged between a groove 217 formed in the mounting portion 218 and a heat insulating member 220 of low heat conductivity attached to the piston 270 to join them together by metal flow processing.

In the embodiment shown in FIG. 5, a heat insulating member 222 of low heat conductivity is interposed between the lower wall portion 216 of the pre-combustion chamber structure 210 and the piston 270; and a metal gasket 223 is interposed between the upper wall portion 215 and the piston 270. The ratio between the sum of passage areas of the communication holes 214 and the inner diameter area of the cylinder 13, i.e., the communication hole area ratio ({sum of communication holes' passage areas}/{inner diameter area of cylinders}) is set in the range of 0.015 to 0.05. The ratio between the volume of the pre-combustion chamber 2 and the sum of the combustion chamber volumes (sum of volumes of the main combustion chamber and the pre-combustion chamber) when the piston is at the top dead center, i.e., the pre-combustion chamber volume ratio ({pre-combustion chamber volume}/{sum of combustion chamber volumes}), is set in the range of 0.35 to 0.65. In the pre-combustion chamber type engine thus constructed, the pre-combustion chamber structure 210 has set to 0.035 cal/°C.·cm³ or lower the ratio β (=C/x) between its heat capacity C and the displacement x (cm³) per cylinder. That is, $$0.00314 \text{ cal/°C.·cm}^3 \leq \beta \leq 0.035 \text{ cal/°C.·cm}^3$$

Alternatively, in this pre-combustion chamber type engine, the ratio α (=C/A) of the heat capacity C of the pre-combustion chamber structure 210 to the surface area A (cm²) of the inner wall surface 25 of the pre-combustion chamber 2 exposed to the burning gas is set to 0.55 cal/°C.·cm² or lower. That is, $$0.058 \text{ cal/°C.·cm}^2 \leq \alpha \leq 0.55 \text{ cal/°C.·cm}^2$$

FIG. 6 shows a still further embodiment of the pre-combustion chamber type engine with a pre-combustion chamber formed in the piston. The members identical with those of FIG. 5 are assigned like reference numeral and their explanation omitted. In this pre-combustion chamber type engine, the pre-combustion chamber structure 310 includes a circumferential wall portion 312; and upper wall portion 315 that closes the top surface of the circumferential wall portion 312 and which has a hole 313 into which a fuel injection nozzle 17 is fitted and communication holes 314 for communicating the pre-combustion chamber 2 and the main combustion chamber; a lower wall portion 316 that closes the bottom surface of the circumferential wall portion 312; and a mounting portion 318 provided to the lower wall portion 316 and having threads 317 formed in the outer circumference thereof. These members are formed of a heat resisting metal such as SUS. In the pre-combustion chamber type engine constructed in this way, the pre-combustion chamber structure 310 is installed in the cavity 271 formed in the piston 270, with a heat insulation air layer 80 formed therebetween. The mounting portion 318 is inserted into a hole 273 formed in the bottom wall 272 of the cavity 271 and is securely fixed by fastening a nut 321 on the threads 317. Heat insulating members 320, 322 of low heat conductivity are interposed between the nut 321 and the piston 270 and between the lower wall portion 316 and the piston 270, respectively. A metal gasket 323 of a heat resisting metal is interposed between the upper wall portion 315 and the piston 270. The pre-combustion chamber structure 310 thus constructed has set to 0.035 cal/°C.·cm³ or lower the ratio β (=C/x) between its heat capacity C and the displacement x (cm³) per cylinder. That is, $$0.00314 \text{ cal/°C.·cm}^3 \leq \beta \leq 0.035 \text{ cal/°C.·cm}^3$$

Alternately, in this pre-combustion chamber type engine, the ratio α (=C/A) of the heat capacity C of the pre-combustion chamber structure 310 to the surface area A (cm²) of the inner wall surface 25 of the pre-combustion chamber 2 exposed to the burning gas is set to 0.55 cal/°C.·cm² or lower. That is, $$0.058 \text{ cal/°C.·cm}^2 \leq \alpha \leq \text{cal/°C.·cm}^2$$

FIG. 7 shows a further embodiment of the pre-combustion chamber type engine with a pre-combustion chamber formed in the piston. Members identical with those of FIG. 5 and 7 are given like reference numerals and their explanations omitted. In the pre-combustion chamber type engine of this embodiment, the pre-combustion chamber structure 410 includes a circumferential wall portion 412; an upper wall portion 415 which closes the top surface of the circumferential wall portion 412 and has a hole 413 in which the fuel injection nozzle 17 is inserted and communication holes 414 for communicating the pre-combustion chamber 2 and the main combustion chamber; and a lower wall portion 416 that closes the bottom surface of the circumferential wall portion 412. These are made of a material that forms the body of the piston 270. The upper wall portion 415 is formed integral with the body of the piston 270 body through a connecting portion 420. The pre-combustion chamber structure 410 is connected to the piston 270 body only through the top of the piston 270 and the connecting portion 420, with other portions heat-insulated by air. Denoted 230, 230 are ribs that connect the body of the piston 270 and a boss 240 of the piston. In the pre-combustion chamber type engine constructed in this way, the pre-combustion chamber structure 410 has set to 0.035 cal/°C.·cm³ or lower the ratio β (=C/x) between its heat capacity C and the displacement x (cm³) per cylinder. That is, $$0.00314 \text{ cal/°C.·cm}^3 \leq \beta \leq 0.035 \text{ cal/°C.·cm}^3$$

Alternatively, in this pre-combustion chamber type engine, the ratio α (=C/A) of the heat capacity C of the pre-combustion chamber structure 410 to the surface area A (cm²) of the inner wall surface 25 of the pre-combustion chamber 2 exposed to the burning gas is set to 0.55 cal/°C.·cm² or lower. That is, $$0.058 \text{ cal/°C.·cm}^2 \leq \alpha \leq 0.55 \text{ cal/°C.·cm}^2$$

What is claimed is:

1. A pre-combustion chamber-type engine comprising:
   a cylinder block having cylinder bores;
   a cylinder head mounted to the cylinder block;
   main combustion chambers in the cylinder bores;
   pistons that reciprocate in the cylinder bores; cavities formed in any one of the cylinder head and a group of the pistons;
   pre-combustion chamber structures installed in the cavities with heat insulation layers interposed therebetween;
   pre-combustion chambers formed in the pre-combustion chamber structures;
   communication holes formed in the pre-combustion chamber structures to communicate the pre-combustion chambers and the main combustion chambers; and
   fuel injection nozzles to inject fuel into the pre-combustion chambers;
   wherein the pre-combustion chamber structures are installed in the cavities in such a way as to be surrounded and heat-insulated by the heat insulation layers and the ratio of heat capacity of the pre-combustion chamber structures to the displacement of the cylinder bores is set to 0.035 cal/°C.·cm³ or lower, and
   wherein when the ratio of the heat capacity of the chamber structures to the displacement per cylinder is set to 0.035 cal/°C.·cm³ or lower, the compression ratio as related to the per cylinder displacement is demarcated at the upper limit by an approximation equation:

$$y = 0.03579z - 2.2$$

where $Z=1/(-0.01029x^{1/3}-1)$, y is the compression ratio and x is a non-dimensional number of displacement.

2. A pre-combustion chamber type engine according to claim 1, wherein the pre-combustion chamber structures are each installed in the cavities formed in the cylinder head with a gap between the exterior of the pre-combustion chamber structures and the cavities.

3. A pre-combustion chamber type engine according to claim 2, wherein the pre-combustion chamber structures each comprise an upper member and a lower member that are made of a heat resisting material and divided from each other in a direction crossing the cylinder bore axis, and a damping ring is installed between the upper member and the lower member.

4. A pre-combustion chamber type engine according to claim 2, wherein the pre-combustion chamber structures each comprise an inner wall member made of a ceramics material and a reinforcement ring made of a metal material fitted over the outer circumference of the inner wall member.

5. A pre-combustion chamber type engine according to claim 4, wherein the inner wall member of each of the pre-combustion chamber structures comprises an upper member and a lower member that are made of a heat resisting material and divided from each other in a direction crossing the cylinder bore axis.

6. A pre-combustion chamber type engine according to claim 4, wherein the reinforcement ring of the pre-combustion chamber structures is tightened around the outer circumference of the inner wall member by shrinkage fit.

7. A pre-combustion chamber type engine according to claim 4, wherein the reinforcement ring of the pre-combustion chamber structures is tightened around the outer circumference of the inner wall member by casting.

8. A pre-combustion chamber type engine according to claim 2, wherein the pre-combustion chamber structures are formed of a heat resisting metal and a flange portion formed at the lower part of the pre-combustion chamber structures is fitted under pressure into the cavities of the cylinder head.

9. A pre-combustion chamber type engine according to claim 1, wherein the pre-combustion chamber structures are installed in the cavities formed in the pistons with a gap formed between the exterior of the pre-combustion chamber structures and the cavities, and the pre-combustion chamber structures are formed with an insertion hole through which the fuel injection nozzle protrudes into the pre-combustion chamber when the piston is near the top dead center.

10. A pre-combustion chamber type engine according to claim 9, wherein the pre-combustion chamber structures each comprise a circumferential wall portion made of a ceramics material, an upper wall portion that closes the top surface of the circumferential wall portion and has a communication hole to communicate the pre-combustion chamber and the main combustion chambernd an insertion hole through which a fuel injection nozzle is inserted, a lower wall portion that closes the bottom surface of the circumferential wall portion, and a mounting portion provided to the lower wall portion and having a groove formed in the outer circumference of the lower end thereof, the groove in the mounting portion being joined to the piston by metal flow processing.

11. A pre-combustion chamber type engine according to claim 9, wherein the pre-combustion chamber structures each comprise a circumferential wall portion made of a heat resisting metal, an upper wall portion that closes the top surface of the circumferential wall portion and has a communication hole to communicate the pre-combustion chamber and the main combustion chamber and an insertion hole through which a fuel injection nozzle protrudes into the pre-combustion chamber, a lower wall portion that closes the bottom surface of the circumferential wall portion, and a mounting portion provided to the lower wall portion and having the outer circumference thereof threaded, which is fastened with a nut to fix the pre-combustion chamber structure to the piston.

12. A pre-combustion chamber type engine according to claim 9, wherein the pre-combustion chamber structures each comprise a circumferential wall portion made of a heat resisting metal, an upper wall portion that closes the top surface of the circumferential wall portion and has a communication hole to communicate the pre-combustion chamber and the main combustion chamber and an insertion hole through which a fuel injection nozzle protrudes into the pre-combustion chamber, a lower wall portion that closes the bottom surface of the circumferential wall portion, and a mounting portion provided to the lower wall portion and having the outer circumference thereof threaded, with only the upper wall portion joined to the top of the piston body.

13. A pre-combustion chamber type engine comprising:
a cylinder block having cylinder bores;
a cylinder head mounted to the cylinder block;
main combustion chambers in the cylinder bores;
pistons that reciprocate in the cylinder bores; cavities formed in any one of the cylinder head and a group of the pistons;
pre-combustion chamber structures installed in the cavities with heat insulation layers interposed therebetween;
pre-combustion chamber formed in the pre-combustion chamber structures;
communication holes formed in the pre-combustion chamber structures to communicate the pre-combustion chambers and the main combustion chambers; and
fuel injection nozzles to inject fuel into the pre-combustion chambers;
wherein the pre-combustion chamber structures are installed in the cavities in such a way as to be surrounded and heat-insulated by the heat insulation layers and the ratio of heat capacity of the pre-combustion chamber structures to the inner surface area of the pre-combustion chambers is set to 0.55 cal/°C.·cm² or lower, and wherein when the ratio of the heat capacity of the pre-combustion chamber structures to the inner surface area of the pre-combustion chambers is set to 0.55 cal/°C.·cm² or lower, the compression ratio as related to the inner surface area of the pre-combustion chambers is demarcated at the upper limit by an approximation equation:

$$y = 0.03579 z - 2.2$$

where $Z = 1/(-0.01029 s^{1/3} - 1)$, y is the compression ratio and s is a non-dimensional number of the inner surface area.

14. A pre-combustion chamber type engine according claim 13, wherein the pre-combustion chamber structures are each installed in the cavities formed in the cylinder head with a gap between the exterior of the pre-combustion chamber structures and the cavities.

15. A pre-combustion chamber type engine according to claim 14, wherein the pre-combustion chamber structures each comprise an upper member and a lower member that are made of a heat resisting material and divided from each other in a direction crossing the cylinder bore axis, and a damping ring is installed between the upper member and the lower member.

16. A pre-combustion chamber type engine according to claim 14, wherein the pre-combustion chamber structures each comprise an inner wall member made of a ceramics material and a reinforcement ring made of a metal material fitted over the outer circumference of the inner wall member.

17. A pre-combustion chamber type engine according to claim 16, wherein the inner wall member of each of the pre-combustion chamber structures comprises an upper member and a lower member that are made of a heat resisting material and divided from each other in a direction crossing the cylinder bore axis.

18. A pre-combustion chamber type engine according to claim 16, wherein the reinforcement ring of the pre-combustion chamber structures is tightened around the outer circumference of the inner wall member by shrinkage fit.

19. A pre-combustion chamber type engine according to claim 16, wherein the reinforcement ring of the pre-combustion chamber structures is tightened around the outer circumference of the inner wall member by casting.

20. A pre-combustion chamber type engine according to claim 16, wherein the pre-combustion chamber structures are formed of a heat resisting metal and a flange portion formed at the lower part of the pre-combustion chamber structures is fitted under pressure into the cavities of the cylinder head.

21. A pre-combustion chamber type engine according to claim 13, wherein the pre-combustion chamber structures are installed in the cavities formed in the pistons with a gap formed between the exterior of the pre-combustion chamber structures and the cavities, and the pre-combustion chamber structures are formed with an insertion hole through which the fuel injection nozzle protrudes into the pre-combustion chamber when the piston is near the top dead center.

22. A pre-combustion chamber type engine according to claim 21, wherein the pre-combustion chamber structures each comprise a circumferential wall portion made of a ceramics material, an upper wall portion that closes the top surface of the circumferential wall portion and has a communication hole to communicate the pre-combustion chamber and the main combustion chamber and an insertion hole through which a fuel injection nozzle is inserted, a lower wall portion that closes the bottom surface of the circumferential wall portion, and a mounting portion provided to the lower wall portion and having a groove formed in the outer circumference of the lower end thereof, the groove in the mounting portion being joined to the piston by metal flow processing.

23. A pre-combustion chamber type engine according to claim 21, wherein the pre-combustion chamber structures each comprise a circumferential wall portion made of a heat resisting metal, an upper wall portion that closes the top surface of the circumferential wall portion and has a communication hole to communicate the pre-combustion chamber and the main combustion chamber and an insertion hole through which a fuel injection nozzle protrudes into the pre-combustion chamber, a lower wall portion that closes the bottom surface of the circumferential wall portion, and a mounting portion provided to the lower wall portion and having the outer circumference thereof threaded, which is fastened with a nut to fix the pre-combustion chamber structure to the piston.

24. A pre-combustion chamber type engine according to claim 21, wherein the pre-combustion chamber structures each comprise a circumferential wall portion made of a heat resisting metal, an upper wall portion that closes the top surface of the circumferential wall portion and has a communication hole to communicate the pre-combustion chamber and the main combustion chamber and an insertion hole through which a fuel injection nozzle protrudes into the pre-combustion chamber, a lower wall portion that closes the bottom surface of the circumferential wall portion, and a mounting portion provided to the lower wall portion and having the outer circumference thereof threaded, with only the upper wall portion joined to the top of the piston body.

* * * * *